United States Patent
Ito et al.

(10) Patent No.: US 10,654,431 B2
(45) Date of Patent: May 19, 2020

(54) IN-VEHICLE DEVICE FIXING STRUCTURE AND STRUCTURE FOR FIXING IN-VEHICLE DEVICE

(71) Applicant: TOYOTA JIDOSHA KABUSHIKI KAISHA, Toyota-shi, Aichi-ken (JP)

(72) Inventors: Keita Ito, Aichi-gun (JP); Yasuhiro Kondo, Toyoake (JP); Akira Nishino, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 196 days.

(21) Appl. No.: 15/640,688

(22) Filed: Jul. 3, 2017

(65) Prior Publication Data
US 2018/0015893 A1   Jan. 18, 2018

(30) Foreign Application Priority Data
Jul. 14, 2016 (JP) ................... 2016-139687

(51) Int. Cl.
| | |
|---|---|
| *B60R 16/04* | (2006.01) |
| *F16B 17/00* | (2006.01) |
| *H01M 2/10* | (2006.01) |
| *F16B 2/10* | (2006.01) |
| *F16B 2/12* | (2006.01) |

(52) U.S. Cl.
CPC ............ *B60R 16/04* (2013.01); *F16B 17/00* (2013.01); *H01M 2/1083* (2013.01); *F16B 2/10* (2013.01); *F16B 2/12* (2013.01)

(58) Field of Classification Search
CPC . B60R 16/04; B60R 16/0215; B60R 16/0207; F16B 17/00
USPC ................ 248/224.8, 27.1, 27.3; 429/186
See application file for complete search history.

(56) References Cited

U.S. PATENT DOCUMENTS

| | | | | |
|---|---|---|---|---|
| 2,947,373 A | * | 8/1960 | Wilson | .................. B60R 16/04 180/68.5 |
| 3,053,336 A | * | 9/1962 | Zednik, Jr. | .............. B60R 16/04 180/68.5 |
| 3,199,624 A | * | 8/1965 | Burns | ..................... B60R 16/04 180/68.5 |

(Continued)

FOREIGN PATENT DOCUMENTS

| | | |
|---|---|---|
| CN | 2900253 Y | 5/2007 |
| CN | 203681447 U | 7/2014 |

(Continued)

*Primary Examiner* — Nkeisha Smith
(74) *Attorney, Agent, or Firm* — Oliff PLC

(57) ABSTRACT

An in-vehicle device fixing structure includes: a base member including a bottom wall, a first side wall, and a second side wall; a box-shaped in-vehicle device including a first side face opposed to the first side wall, a second side face opposed to the second side wall, a third side face provided on a side opposite to the first side face, and a fourth side face provided on a side opposite to the second side face; a holding member including a third-side-face holding portion opposed to the third side face, a fourth-side-face holding portion opposed to the fourth side face, and a fastening portion attached to the bottom wall via a fastener and having a plate shape; and an in-vehicle device locking portion provided in at least the base member and the holding member, and configured to restrain a movement of the in-vehicle device toward the vehicle upper side.

16 Claims, 14 Drawing Sheets

(56) References Cited

U.S. PATENT DOCUMENTS

| | | | |
|---|---|---|---|
| 6,230,834 B1* | 5/2001 | Van Hout | B60R 16/04 180/68.5 |
| 6,290,013 B1* | 9/2001 | Bienenstein, Jr. | B60R 16/04 180/68.5 |
| 7,389,841 B2* | 6/2008 | Boville | B60R 16/04 180/68.5 |
| 7,726,427 B2* | 6/2010 | Picavet | H01M 2/1083 180/68.5 |
| 9,073,498 B2* | 7/2015 | Lee | B60R 16/04 |
| 10,177,356 B1* | 1/2019 | Yang | H01M 2/1083 |
| 10,183,637 B2* | 1/2019 | Uraguchi | B60R 16/04 |
| 10,266,136 B2* | 4/2019 | Toyoda | B60R 16/04 |
| 10,322,689 B1* | 6/2019 | Oyama | B60R 16/04 |
| 2002/0079152 A1* | 6/2002 | Van Hout | B60R 16/04 180/68.5 |
| 2009/0226806 A1 | 9/2009 | Kiya | |
| 2013/0189555 A1* | 7/2013 | Munro | B60R 16/04 429/100 |
| 2018/0366703 A1* | 12/2018 | Izumi | B60R 16/04 |

FOREIGN PATENT DOCUMENTS

| | | | |
|---|---|---|---|
| JP | 2005-053261 A | 3/2005 | |
| JP | 2007-230329 A | 9/2007 | |
| JP | 2016-002971 A | 1/2016 | |

* cited by examiner

FIG. 14B
RELATED ART
FIG. 14A
RELATED ART
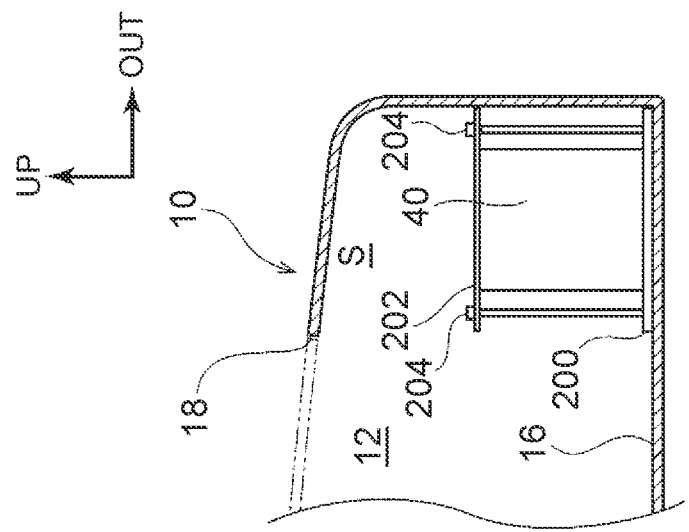
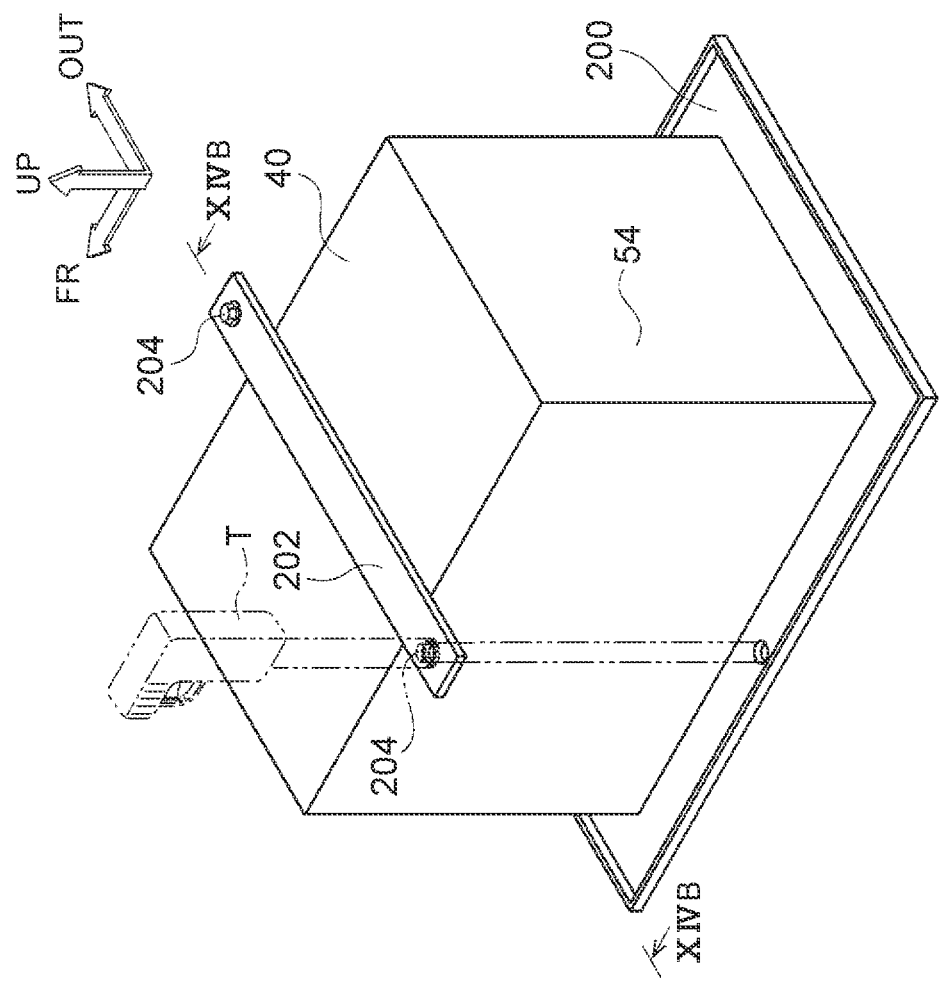

IN-VEHICLE DEVICE FIXING STRUCTURE AND STRUCTURE FOR FIXING IN-VEHICLE DEVICE

INCORPORATION BY REFERENCE

The disclosure of Japanese Patent Application No. 2016-139687 filed on Jul. 14, 2016 including the specification, drawings and abstract is incorporated herein by reference in its entirety.

BACKGROUND

1. Technical Field

The present disclosure relates to an in-vehicle device fixing structure and a structure for fixing an in-vehicle device.

2. Description of Related Art

A battery fixing device of a vehicle is disclosed in Japanese Patent Application Publication No. 2016-2971 (JP 2016-2971 A). The battery fixing device is provided with a base member on which a battery is placed, and a presser bar is provided on a vehicle upper side of the battery. Bolts are provided on both ends of the presser bar in a longitudinal direction, and lower ends of the bolts are locked to the base member. Further, upper ends of the bolts are fixed with nuts via the presser bar. When the bolts are fixed with the nuts as such, the presser bar holds down the battery from its upper side so as to fix the battery to the base member.

SUMMARY

However, in a case of the related art described in JP 2016-2971 A, the presser bar is provided on a top side of the battery. That is, at the time of fastening the nuts to the bolts in both ends of the presser bar in the longitudinal direction, a space where a tool to fasten the nuts to the bolts is placed is required on the vehicle upper side relative to the battery. On this account, there is room for improvement in order to save a space around the battery fixing device.

The present disclosure provides an in-vehicle device fixing structure and a structure for fixing an in-vehicle device, that can reduce a space in which an in-vehicle device is placed.

A first aspect of the disclosure provides an in-vehicle device fixing structure. The in-vehicle device fixing structure according to the first aspect includes: a base member attached to a vehicle body, the base member including a flat-shaped bottom wall, a first side wall expanding toward a vehicle upper side from the bottom wall and substantially along a vehicle width direction, and a second side wall expanding toward the vehicle upper side from the bottom wall and substantially along a vehicle front-rear direction; an in-vehicle device having a box shape, the in-vehicle device including a first side face that is opposed to the first side wall when the in-vehicle device is placed on the bottom wall, a second side face that is opposed to the second side wall when the in-vehicle device is placed on the bottom wall, a third side face provided on a side opposite to the first side face, and a fourth side face provided on a side opposite to the second side face; a holding member including a third-side-face holding portion opposed to the third side face of the in-vehicle device, a fourth-side-face holding portion opposed to the fourth side face of the in-vehicle device, and a fastening portion attached to the bottom wall of the base member via a fastener and having a plate shape; and an in-vehicle device locking portion provided in at least the base member and the holding member among the base member, the in-vehicle device, and the holding member, the in-vehicle device locking portion being configured to restrain a movement of the in-vehicle device toward the vehicle upper side.

According to the above aspect, the in-vehicle device is placed on the base member attached to the vehicle body. Further, the in-vehicle device is sandwiched in the vehicle front-rear direction by the first side wall of the base member which abuts with the first side face of the in-vehicle device and the third-side-face holding portion of the holding member which is opposed to the third side face of the in-vehicle device. Similarly, the in-vehicle device is sandwiched in the vehicle width direction by the second side wall of the base member which is opposed to with the second side face of the in-vehicle device and the fourth-side-face holding portion of the holding member which is opposed to the fourth side face of the in-vehicle device. Accordingly, a movement of the in-vehicle device generally in a horizontal plane is restrained. Further, a movement of the in-vehicle device in the vehicle up-down direction is also restrained by the in-vehicle device locking portions. This makes it possible to fix the in-vehicle device to the base member, eventually, the vehicle body.

The holding member is attached to the bottom wall of the base member via the fastener in the fastening portion, but since the fastening portion has a plate shape, the fastening portion is attached to the bottom wall of the base member in the vicinity of a lower end of the in-vehicle device. Accordingly, a tool for fastening the fastener at the time of attaching the holding member to the base member is placed on the basis of the lower end of the in-vehicle device. That is, since the tool is placed inside a space corresponding to a height of the in-vehicle device, it is possible to restrain the tool from projecting toward the vehicle upper side from the in-vehicle device. On this account, an operation space is unnecessary on the vehicle upper side relative to the in-vehicle device or the operation space to be provided on the vehicle upper side relative to the in-vehicle device can be reduced. Further, since the holding member is provided on the third side face side of the in-vehicle device and the fourth side face side thereof, an operation space for attaching the holding member to the first side face side of the in-vehicle device and the second side face side thereof is unnecessary.

Here, it may be considered that the "in-vehicle device locking portion" include ones provided in the base member and the holding member and ones provided in the base member, the holding member, and the in-vehicle device.

In the first aspect, the in-vehicle device locking portion may include: projecting portions provided in respective lower ends of the first side face, the second side face, the third side face, and the fourth side face so as to project outside the in-vehicle device; and engageable portions provided in the base member and the holding member so as to be engaged with the projecting portions.

According to the above aspect, since the projecting portion of the in-vehicle device is provided in the lower end of the in-vehicle device, the projecting portion is engaged with the engageable portion on a lower end side of the in-vehicle device. That is, positions of the in-vehicle device locking portions are placed at positions close to the bottom wall of the base member. Accordingly, when a horizontal load is input into the in-vehicle device placed on the base member and the in-vehicle device is to be inclined in one direction around a part where the in-vehicle device abuts with the bottom wall, a displacement amount of the inclination is smaller on the lower end side of the in-vehicle device than its upper end side, so that a load applied to the engageable portion due to this displacement is small. This makes it possible to restrain deformation of the engageable portion, thereby making it possible to more surely hold the in-vehicle device.

In the first aspect, the fastening portion may be placed in either one of the third-side-face holding portion and the fourth-side-face holding portion.

According to the above aspect, the fastening portion is placed only in one of the third-side-face holding portion and the fourth-side-face holding portion of the holding member. Accordingly, the one of the third-side-face holding portion and the fourth-side-face holding portion, which is not provided with the fastening portion, does not require an operation space for fastening the fastener. This makes it possible to further reduce a space in which the in-vehicle device is to be placed.

In the first aspect, respective upper ends of the first side wall and the second side wall and respective upper ends of the third-side-face holding portion and the fourth-side-face holding portion may be placed on the vehicle upper side relative to a gravitational center of the in-vehicle device.

According to the above aspect, respective upper ends of the first side wall, the second side wall, the third-side-face holding portion, and the fourth-side-face holding portion that are opposed to the in-vehicle device are placed on the vehicle upper side relative to a gravitational center of the in-vehicle device. Accordingly, even in a case where a load is input into the in-vehicle device and the in-vehicle device is to rotate around the gravitational center of the in-vehicle device, it is possible to restrain the in-vehicle device from getting over the first side wall and the second side wall of the base member and the third-side-face holding portion and the fourth-side-face holding portion of the holding member. This accordingly makes it possible to more surely hold the in-vehicle device.

In the first aspect, inserts may be provided in at least one of the third-side-face holding portion and the fourth-side-face holding portion, the inserts extending substantially toward a vehicle lower side. Through-holes may be provided in the bottom wall at respective positions corresponding to the inserts. The inserts may be inserted into the through-holes.

According to the above aspect, the insert is provided so as to extend generally toward the vehicle lower side, and is inserted into the through-hole of the base member. Accordingly, even when a load is input into the holding member from the in-vehicle device, the load is transmitted to the base member by the insert, thereby making it possible to restrain deformation of the holding member. This accordingly makes it possible to more surely hold the in-vehicle device.

Further, since the insert is inserted into the through-hole of the base member, an operation of fastening the fastener is unnecessary, so that an operation space for fastening the insert to the base member is unnecessary. This makes it possible to further reduce a space in which the in-vehicle device is to be placed.

Here, the phrase "insert" may include a case where the insert passes through the through-hole and a case where a tip end of the insert remains inside the through-hole.

In the above aspect, the inserts may be placed in both ends of the third-side-face holding portion in the vehicle width direction and in both ends of the fourth-side-face holding portion in the vehicle front-rear direction.

According to the above aspect, when a load to rotate the in-vehicle device generally in the horizontal direction is input into the in-vehicle device, both ends of the third-side-face holding portion of the holding member in the vehicle width direction receive a force to move the both ends generally along the vehicle front-rear direction and both ends of the fourth-side-face holding portion of the holding member in the vehicle front-rear direction receive a force to move the both ends generally along the vehicle width direction. Since the inserts are placed in both ends of the third-side-face holding portion, a force to move the both ends generally along the vehicle front-rear direction is transmitted to the base member effectively. Further, since the inserts are placed in both ends of the fourth-side-face holding portion, a force to move the both ends generally along the vehicle width direction is transmitted to the base member effectively. Accordingly, it is possible to more effectively restrain the rotation of the holding member, eventually, the in-vehicle device. This accordingly makes it possible to more surely hold the in-vehicle device.

In the above aspect, the insert may include a reinforcing portion provided in a part of the insert in a width direction of the insert, along a longitudinal direction of the insert, the reinforcing portion having a strength larger than the other part of the insert.

In the above aspect, the fastening portion may be placed in either one of the third-side-face holding portion and the fourth-side-face holding portion, and the inserts may be placed in the other one of the third-side-face holding portion and the fourth-side-face holding portion, the other one being not provided with the fastening portion.

A second aspect of the disclosure provides a structure for fixing an in-vehicle device. In the second aspect, the in-vehicle device having a box shape and including a first side face, a second side face, a third side face provided on a side opposite to the first side face, and a fourth side face provided on a side opposite to the second side face. The structure according to the second aspect includes: a base member attached to a vehicle body, the base member includes a bottom wall having a flat shape, a first side wall extending toward a vehicle upper side from the bottom wall and substantially along a vehicle width direction, the first side wall being opposed to the first side face when the in-vehicle device is placed on the bottom wall, and a second side wall extending toward the vehicle upper side from the bottom wall and substantially along a vehicle front-rear direction, the second side wall being opposed to the second side face when the in-vehicle device is placed on the bottom wall; a holding member including a third-side-face holding portion opposed to the third side face of the in-vehicle device, a fourth-side-face holding portion opposed to the fourth side face of the in-vehicle device, and a fastening portion attached to the bottom wall of the base member via a fastener and having a plate shape; and an in-vehicle device locking portion provided in at least the base member and the holding member among the base member, the in-vehicle device, and the holding member, the in-vehicle device locking portion being configured to restrain movement of the in-vehicle device toward the vehicle upper side.

In the second aspect, the in-vehicle device locking portion may include: projecting portions provided in respective lower ends of the first side face, the second side face, the third side face, and the fourth side face so as to project outside the in-vehicle device; and engageable portions provided in the base member and the holding member so as to be engaged with the projecting portions.

In the second aspect, the fastening portion may be placed in either one of the third-side-face holding portion and the fourth-side-face holding portion.

In the second aspect, inserts may be provided in at least one of the third-side-face holding portion and the fourth-side-face holding portion, the inserts extending substantially toward a vehicle lower side. Through-holes may be provided in the bottom wall at respective positions corresponding to the inserts. The inserts may be inserted into the through-holes.

A third aspect of the disclosure provides an in-vehicle device fixing structure. The in-vehicle device fixing structure according to the third aspect includes: a base member attached to a vehicle body, the base member including bottom wall having a flat-shape, a first side wall expanding toward a vehicle upper side from the bottom wall and along a first direction perpendicular to a vehicle up-down direction, and a second side wall expanding toward the vehicle upper side from the bottom wall and along a second direction perpendicular to the vehicle up-down direction and the first direction; an in-vehicle device having a box shape, the in-vehicle device including a first side face opposed to the first side wall when the in-vehicle device is placed on the bottom wall, a second side face opposed to the second side wall when the in-vehicle device is placed on the bottom wall, a third side face provided on a side opposite to the first side face, and a fourth side face provided on a side opposite to the second side face and a holding member including a third-side-face holding portion being opposed to the third side face of the in-vehicle device, a fourth-side-face holding portion being opposed to the fourth side face of the in-vehicle device, and a fastening portion attached to the bottom wall of the base member via a fastener and having a plate shape. The base member includes a first engageable portion and the holding member includes a second engageable portion; and the first engageable portion and the second engageable portion are configured to be engaged with the in-vehicle device so as to restrain a movement of the in-vehicle device toward the vehicle upper side.

In the third aspect, the in-vehicle device may include projecting portions provided in respective lower ends of the first side face, the second side face, the third side face, and the fourth side face and projecting outside the in-vehicle device, and the first engageable portion and the second engageable portion may be engaged with the projecting portions.

In the third aspect, the fastening portion may be placed in either one of the third-side-face holding portion and the fourth-side-face holding portion.

In the third aspect, inserts may be provided in at least one of the third-side-face holding portion and the fourth-side-face holding portion and extending substantially toward a vehicle lower side. Through-holes may be provided in the bottom wall at respective positions corresponding to the inserts. The inserts may be inserted into the through-holes.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14A is a perspective view illustrating a state where a presser bar of an in-vehicle device fixing structure of a comparative example is fastened to a base member and corresponds to FIG. 4; and FIG. 14B is a sectional view illustrating a state cut along a line XIVB-XIVB in FIG. 14A.

DETAILED DESCRIPTION OF EMBODIMENTS

First Embodiment

The following describes a first embodiment of an in-vehicle device fixing structure of the present disclosure with reference to FIGS. 1 to 4. Note that, in those figures, an arrow FR indicates a front side in a vehicle front-rear direction, an arrow OUT indicates an outer side in a vehicle width direction, and an arrow UP indicates an upper side in a vehicle up-down direction.

Figure 1:
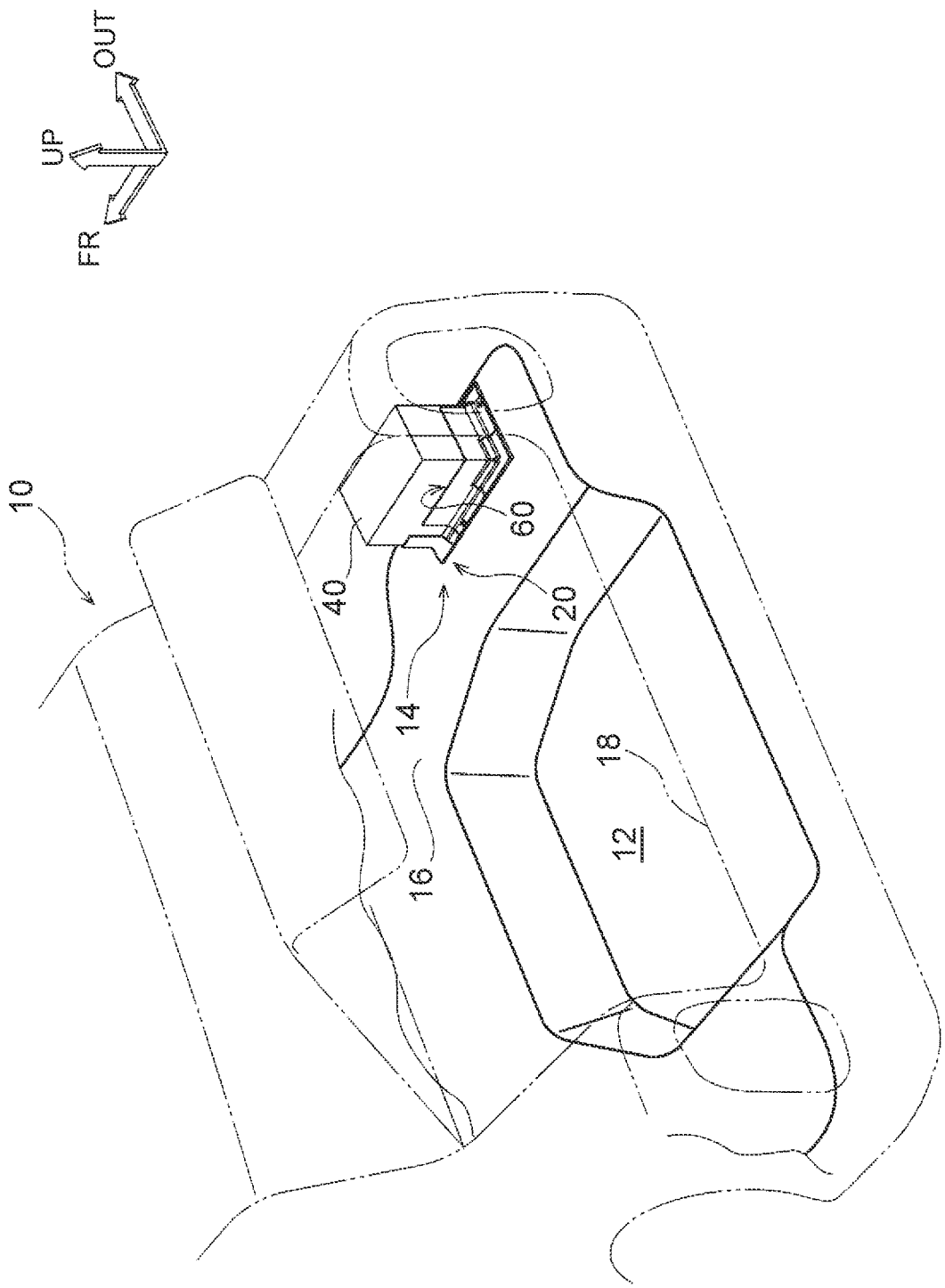
FIG. 1 is a perspective view illustrating a state where the inside of a trunk of a vehicle having an in-vehicle device fixing structure of a first embodiment is viewed from a vehicle rear side.

As illustrated in FIG. 1, an in-vehicle device fixing structure 14 is provided in a trunk room 12 of a vehicle 10. The in-vehicle device fixing structure 14 is placed on one side (a right side in the present embodiment) in the vehicle width direction inside the trunk room 12 and on a floor panel 16 that constitutes a part of a vehicle body Note that the in-vehicle device fixing structure 14 is placed on the outer side in the vehicle width direction relative to a trunk opening 18 that communicates the trunk room 12 with the outside of the vehicle.

Figure 2:
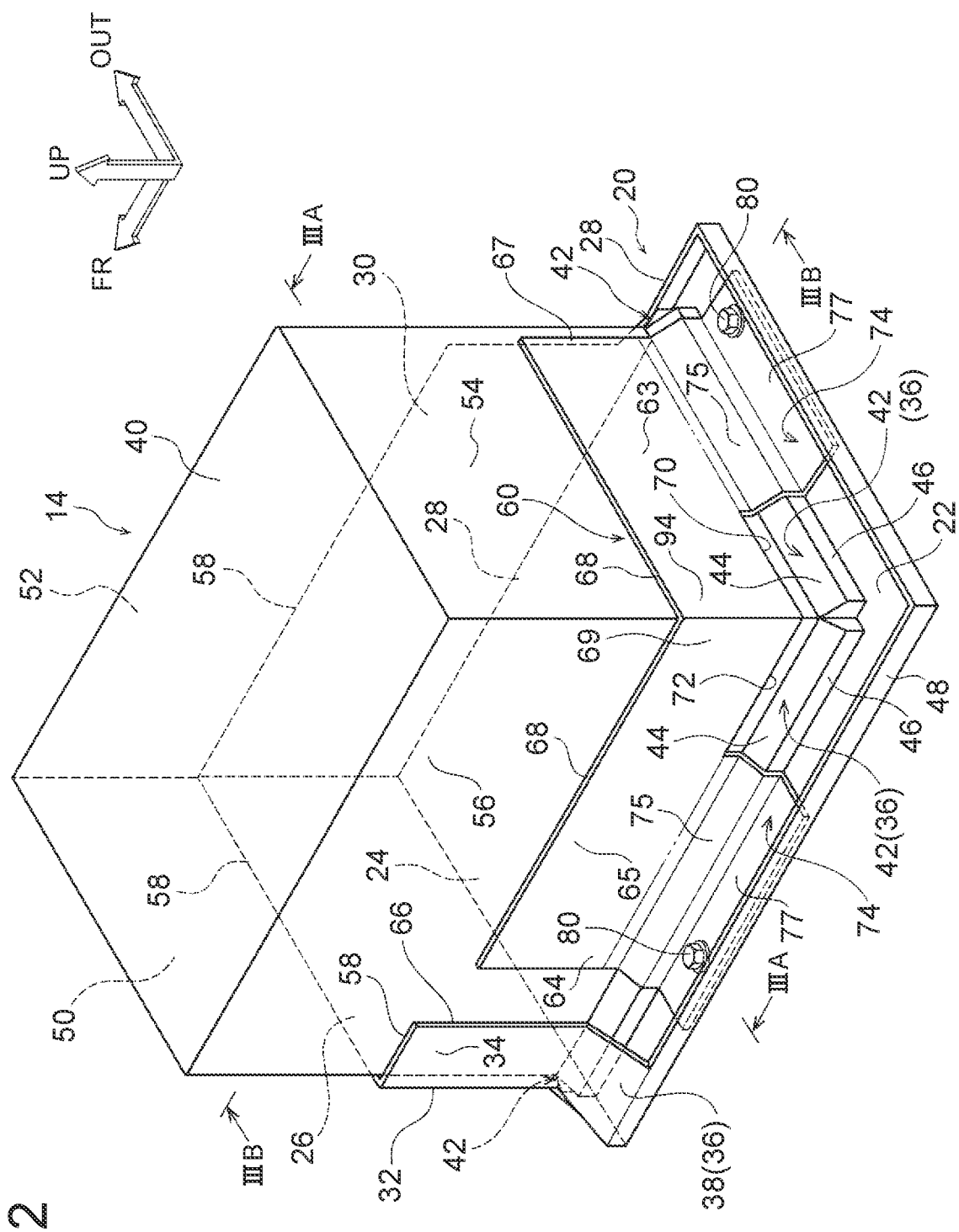
FIG. 2 is a perspective view illustrating the in-vehicle vice fixing structure of the first embodiment.

As illustrated in FIG. 2, the in-vehicle device fixing structure 14 includes a base member 20 attached to the floor panel 16 (see FIG. 1) with a fastener (not shown). The base member 20 includes: a bottom wall portion 22 formed in a rectangular flat-plate shape with its longitudinal direction being along the vehicle front-rear direction in a vehicle plan view; a first side wall portion 26 extending toward a vehicle upper side from a front end 24 of the bottom wall portion 22 and generally along the vehicle width direction; and a second side wall portion 30 extending toward the vehicle upper side from an outer end 28 of the bottom wall portion 22 in the vehicle width direction and generally along the vehicle front-rear direction. An end 32 of the first side wall portion 26 on an inner side in the vehicle width direction includes a third side wall portion 34 formed so as to extend generally toward the vehicle rear side from the end 32. The first side wall portion 26, the second side wall portion 30, and the third side wall portion 34 are formed integrally.

Figure 3A:
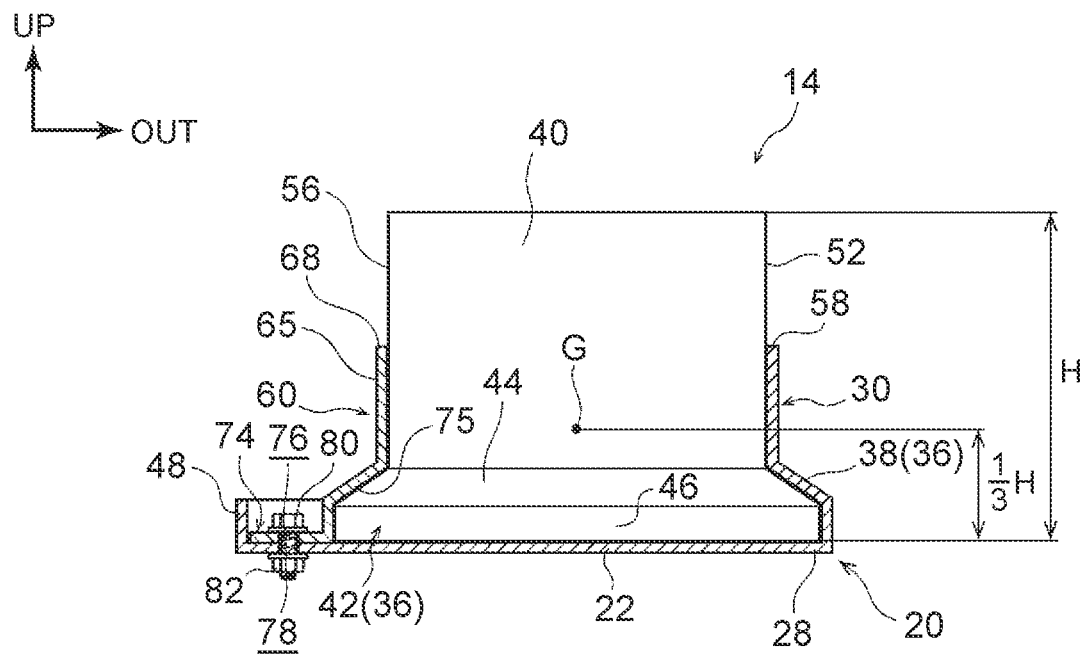
FIG. 3A is a sectional view illustrating a state cut along a line IIIA-IIIA in FIG. 2.
Figure 3B:
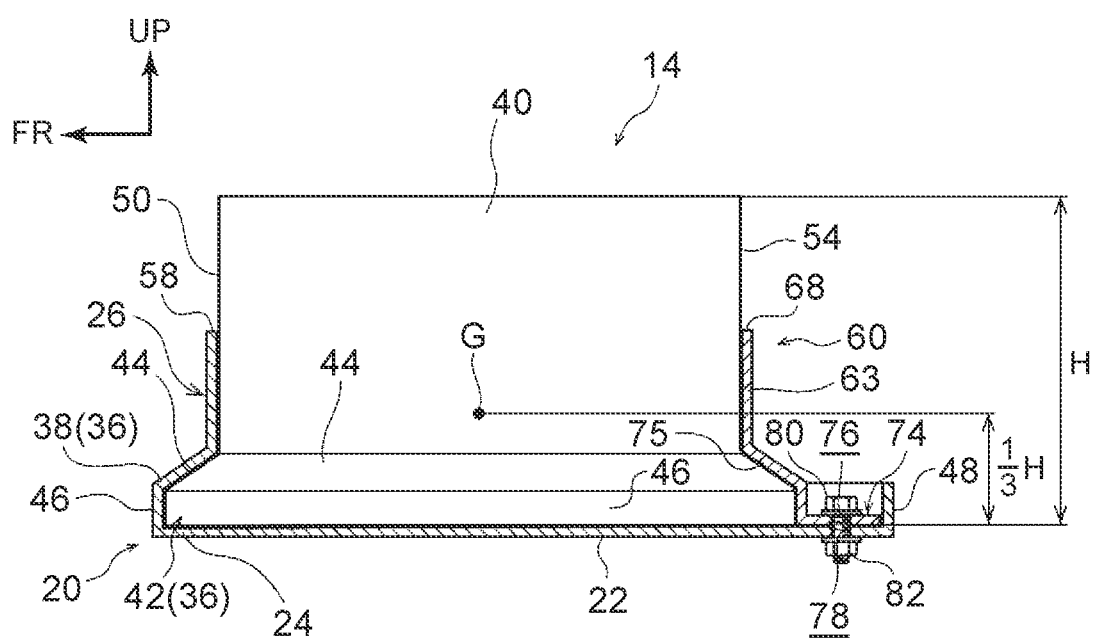
FIG. 3B is a sectional view illustrating a state cut along a line IIIB-IIIB in FIG. 2.

As illustrated in FIG. 3B, an engageable portion 38 constituting a part of an in-vehicle device locking portion 36 projecting toward the vehicle front side generally along a normal direction of the first side wall portion 26 is formed in a lower end of the first side wall portion 26. The engageable portion 38 is formed to have a generally L-shaped section, which is perpendicular to the vehicle width direction, so as to be along an inclined portion 44 and a vertical snake portion 46 in a projecting portion 42 of a battery 40 provided as the after-mentioned in-vehicle device, the projecting portion 42 constituting another part of the in-vehicle device locking portion 36. Similarly, as illustrated in FIG. 3A, respective engageable portions 38 are also formed in a lower end of the second side wall portion 30 and a lower end of the third side wall portion 34.

As illustrated in FIG. 2, a turn-up portions 48 is formed in a part of an outer peripheral end of the bottom wall portion 22 of the base member 20, other than a part where the first side wall portion 26, the second side wall portion 30, and the third side wall portion 34 are formed. The turn-up portion 48 is provided along the outer peripheral end of the bottom wall portion 22 and is formed to be turned generally toward the vehicle upper side.

The battery 40 is placed on the base member 20. The battery 40 is formed in a rectangular box shape with its longitudinal direction being along the vehicle front-rear direction. A side face of the battery 40 is constituted by a first side face portion 50 (see FIG. 3B) abutting with the first side wall portion 26 of the base member 20, a second side face portion 52 (see FIG. 3A) abutting with the second side wall portion 30 of the base member 20, a third side face portion 54 (FIG. 3B) on an opposite side to the first side face portion 50, and a fourth side face portion 56 (FIG. 3A) on an opposite side to the second side face portion 52. Note that the third side wall portion 34 of the base member 20 abuts with the vehicle front side of the fourth side face portion 56 of the battery 40.

As illustrated in FIGS. 3A, 3B, respective upper ends 58 of the first side wall portion 26, the second side wall portion 30, and the third side wall portion 34 of the base member 20 are placed on the vehicle upper side relative to a gravitational center G of the battery 40. As one example, when a dimension from a lower end of the battery 40 to an upper end thereof is assumed H in a side view of the battery 40, the gravitational center G of the battery 40 is positioned at a height of ⅓ H from the lower end of the battery 40. Accordingly, respective upper ends 58 of the first side wall portion 26, the second side wall portion 30, and the third side wall portion 34 are placed at a position that is not lower than ⅓ H from the lower end of the battery 40.

Respective lower ends of the first side face portion 50, the second side face portion 52, the third side face portion 54, and the fourth side face portion 56 of the battery 40 include respective projecting portions 42 formed so as to project generally along respective normal directions. The projecting portion 42 formed in the first side face portion 50 is engaged with the engageable portion 38 of the first side wall portion 26 in the base member 20. Further, the projecting portion 42 formed in the second side face portion 52 is engaged with the engageable portion 38 of the second side wall portion 30 in the base member 20. Further, a part of the projecting portion 42 formed in the fourth side face portion 56 is engaged with the engageable portion 38 of the third side wall portion 34 in the base member 20 (see FIG. 2).

A holding member 60 is attached to the base member 20. The holding member 60 is formed generally in an L-shape in a vehicle plan view (see FIG. 2), and a third-side-face holding portion 63 abutting with the third side face portion 54 of the battery 40 and a fourth-side-face holding portion 65 abutting with the fourth side face portion 56 of the battery are formed integrally. Note that an end 64 of the fourth-side-face holding portion 65 as illustrated in FIG. 2 is placed at a position distanced from a rear end 66 of the third side wall portion 34 of the base member 20.

Respective upper ends 68 of the third-side-Face holding portion 63 and the fourth-side-face holding portion 65 of the holding member 60 are placed on the vehicle upper side relative to the gravitational center G of the battery 40. As one example, in the present embodiment, respective upper ends 68 of the third-side-face holding portion 63 and the fourth-side-face holding portion 65 are placed at a position that is not lower than ⅓ H from the lower end of the battery 40.

Note that, as illustrated in FIG. 2, a lower end 70 of the third-side-face holding portion 63 and a lower end 72 of the fourth-side-face holding portion 65 are placed on the vehicle upper side relative to the projecting portions 42 of the battery 40.

Respective plate-shaped fastening portions 74 are provided on respective vehicle lower sides of the third-side-face holding portion 63 and the fourth-side-face holding portion 65 of the holding member 60. The fastening portion 74 of the third-side-face holding portion 63 is constituted by a fastening vertical wall portion 75 serving as an engageable portion extending along the projecting portion 42 of the battery 40 from a lower end 70 (see an alternate long and two short dashes line in the figure) in an end 67 of the third-side-face holding portion 63 on the outer side in the vehicle width direction toward the vehicle lower side, and a fastening lateral wall portion 77 extending along the bottom wall portion 22 of the base member 20 from a lower end of the fastening vertical wall portion 75 toward the turn-up portion 48 side. Similarly, the fastening portion 74 of the fourth-side-face holding portion 65 is constituted by a fastening vertical wall portion 75 serving as an engageable portion extending along the projecting portion 42 of the battery 40 from a lower end 72 (see an alternate long and two short dashes line in the figure) on an end-64 side of the fourth-side-face holding portion 65 toward the vehicle lower side, and a fastening lateral wall portion 77 extending along the bottom wall portion 22 of the base member 20 from a lower end of the fastening vertical wall portion 75 toward the turn-up portion 48 side.

As illustrated in FIGS. 3A, 3B, fastening holes 76 penetrating in a plate-thickness direction are formed in respective fastening portions 74 of the third-side-face holding portion 63 and the fourth-side-face holding portion 65. Similarly to the fastening portions 74, respective fastening hole 78 penetrating in the plate-thickness direction are formed at respective positions of the bottom wall portion 22 which correspond to respective fastening holes 76 of the fastening portions 74, and when respective bolts 80 as fasteners are passed through the fastening holes 76, 78 so as to be fixed with respective nuts 82, the fastening portions 74, eventually, the holding member 60 is fixed to the base member 20.

Operation/Effect of First Embodiment

Next will be described the operation and effect of the present embodiment.

Here, the following describes the operation and effect of the present embodiment with the use of a comparative example illustrated in FIGS. 14A, 14B. Note that the same constituent as in the present embodiment has the same reference sign as in the present embodiment, and a description thereof is omitted.

As illustrated in FIG. 14B, a floor panel 16 in a trunk room 12 of a vehicle 10 is provided with a base member 200 formed generally in a flat-plate shape. A battery 40 is placed on the base member 200, and a presser bar 202 formed generally in a rectangular plate shape with its longitudinal direction being along the vehicle width direction is provided on the vehicle upper side of the battery 40. Bolts 204 are provided on both ends of the presser bar 202 in the longitudinal direction, and lower ends of the bolts 204 are locked to the base member 200. Further, upper ends of the bolts 204 are fixed with nuts (not shown) via the presser bar 202. When the bolts 204 are fixed with the nuts as such, the presser bar 202 holds down the battery 40 from its upper side so as to fix the battery 40 to the base member 200.

However, in the comparative example, the presser bar 202 is provided on the vehicle upper side of the battery 40. That is, at the time of fastening the nuts to the bolts 204 in both ends of the presser bar 202 in the longitudinal direction, an operation space S where a tool T to fasten the nuts to the bolts 204 is required on the vehicle upper side relative to the battery (also see FIG. 14A). On this account, there is room for improvement in order to save a space around a battery fixing device.

In this regard, in the present embodiment, the battery 40 is placed on the base member 20 attached to the vehicle body as illustrated in FIG. 2. Further, the battery 40 is sandwiched in the vehicle front-rear direction by the first side wall portion 26 of the base member 20 which abuts with the first side face portion 50 of the battery 40 and the third-side-face holding portion 63 of the holding member 60 which abuts with the third side face portion 54 of the battery 40. Similarly, the battery 40 is sandwiched in the vehicle width direction by the second side wall portion 30 of the base member 20 which abuts with the second side face portion 52 of the battery 40 and the fourth-side-face holding portion 65 of the holding member 60 which abuts with the fourth side face portion 56 of the battery 40. Accordingly, a movement of the battery 40 generally in a horizontal plane is restrained. Further, a movement of the battery 40 in the vehicle up-down direction is also restrained by the in-vehicle device locking portion 36. This makes it possible to fix the battery 40 to the base member 20, eventually, the vehicle body.

Figure 4:
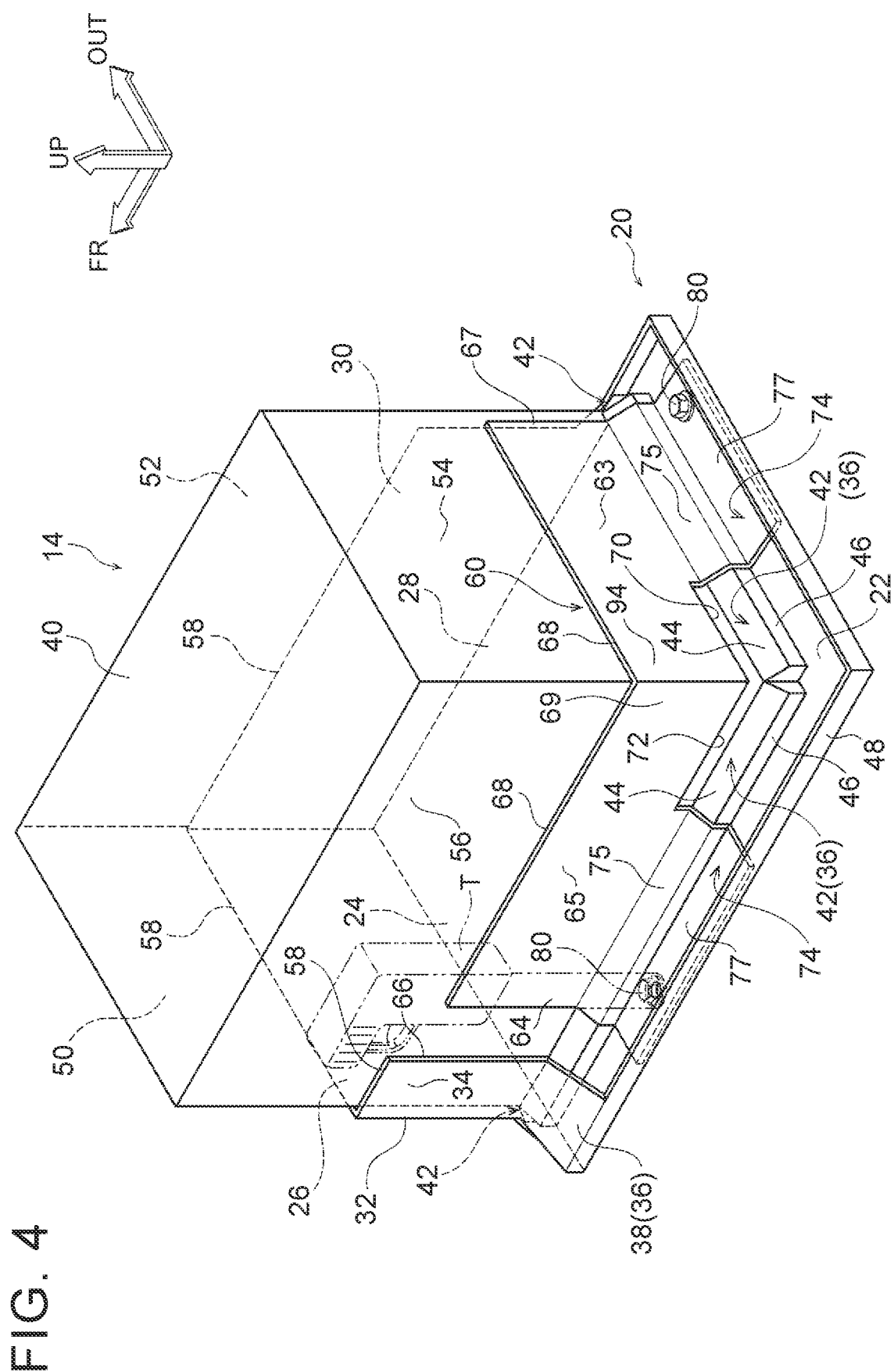
FIG. 4 is a perspective view illustrating a state where a holding member of the in-vehicle device fixing structure of the first embodiment is fastened to a base member.

The holding member 60 is attached to the bottom wall portion 22 of the base member 20 via the bolts 80 in the fastening portion 74. However, since the fastening portion 74 is formed generally in a plate shape, the fastening portion 74 is attached to the bottom wall portion 22 of the base member 20 in the vicinity of a lower end of the battery 40. Accordingly, as illustrated in FIG. 4, the tool. T for fastening the bolt 80 at the time of attaching the holding member 60 to the base member 20 is placed on the basis of the lower end of the battery 40. That is, since the tool T is placed within a space corresponding to the height of the battery 40, it is possible to restrain the tool T from projecting toward the vehicle upper side from the battery 40. On this account, the operation space S as illustrated in FIG. 14B is unnecessary on the vehicle upper side relative to the battery 40 or the operation space S to be provided on the vehicle upper side relative to the battery 40 can be reduced. Further, since the holding member 60 is provided on the third side face portion 54 side of the battery 40 and the fourth side face portion 56 side thereof, an operation space for attaching the holding member 60 is unnecessary on the first side face portion 50 side of the battery 40 and the second side face portion 52 side thereof. This makes it possible to reduce a space in which the battery 40 is to be placed.

Further, since the projecting portion 42 of the battery 40 is provided in the lower end of the battery 40, the projecting portion 42 is engaged with the engageable portion 38 on the lower end side of the battery 40. That is, a position of the engageable portion 38 is placed at a position close to the bottom wall portion 22 of the base member 20. Accordingly, when a horizontal load is input into the battery 40 placed on the base member 20 and the battery 40 is to be inclined in one direction around a part where the battery 40 abuts with the bottom wall portion 22, a displacement amount of the inclination is smaller on the lower end side of the battery 40 than its upper end side, so that a load applied to the engageable portion 38 due to this displacement is small. This makes it possible to restrain deformation of the engageable portion 38, thereby making it possible to more surely hold the battery 40.

Further, respective upper ends 58, 68 of the first side wall portion 26, the second side wall portion 30, the third-side-face holding portion 63, and the fourth-side-face holding portion 65 that abut with the battery 40 are placed on the vehicle upper side relative to the gravitational center of the battery 40. Accordingly, even in a case where a load is input into the battery 40 and the battery 40 is to rotate around the gravitational center G of the battery 40, it is possible to restrain the battery 40 from getting over the first side wall portion 26 and the second side wall portion 30 of the base member 20 and the third-side-face holding portion 63 and the fourth-side-face holding portion 65 of the holding member 60. This makes it possible to more surely hold the battery 40.

Note that, in the present embodiment, the third-side-face holding portion 63 and the fourth-side-face holding portion 65 of the holding member 60 are formed integrally, but alternatively, they may be provided as separate bodies.

Second Embodiment

Next will be described an in-vehicle device fixing structure of a second embodiment of the present disclosure with reference to FIGS. 5, 6. Note that a constituent basically the same as in the first embodiment has the same reference sign as in the first embodiment, and a description thereof is omitted.

Figure 5:
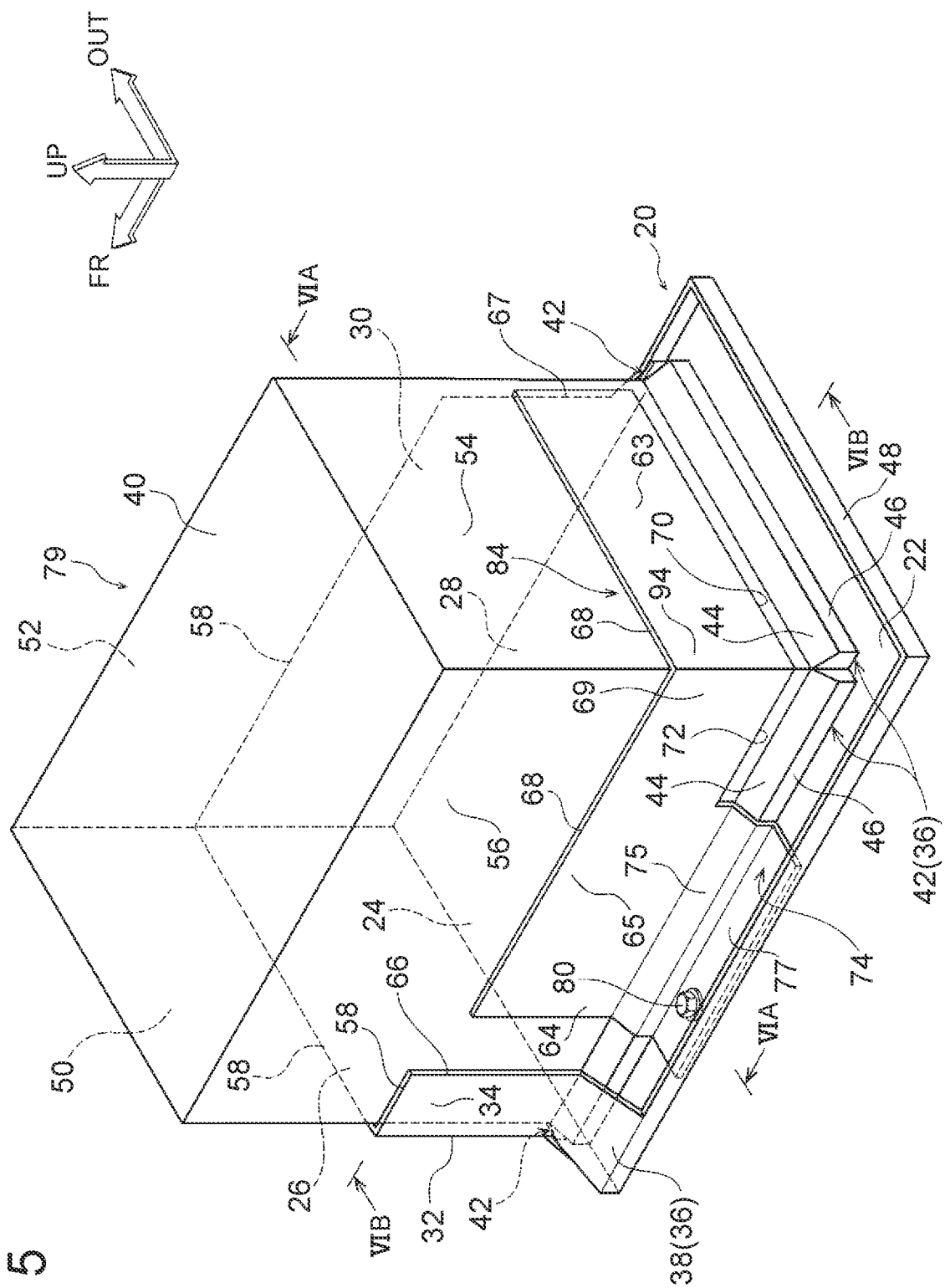
FIG. 5 is a perspective view illustrating an in-vehicle device fixing structure of a second embodiment and corresponds to FIG. 2.
Figure 6A:
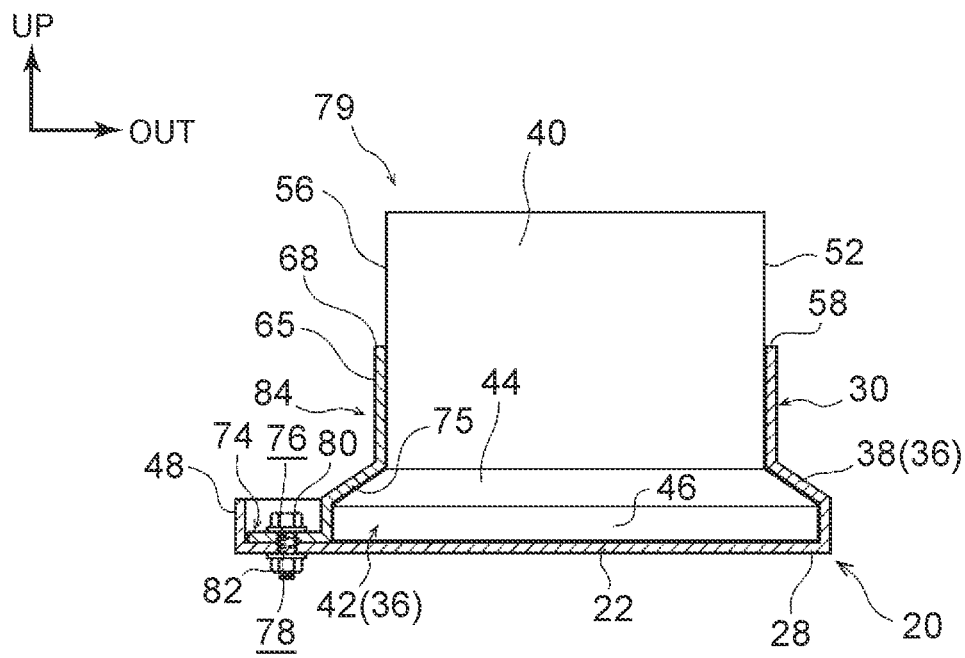
FIG. 6A is a sectional view illustrating a state cut along a line VIA-VIA in FIG. 5 and corresponds to FIG. 3A.
Figure 6B:
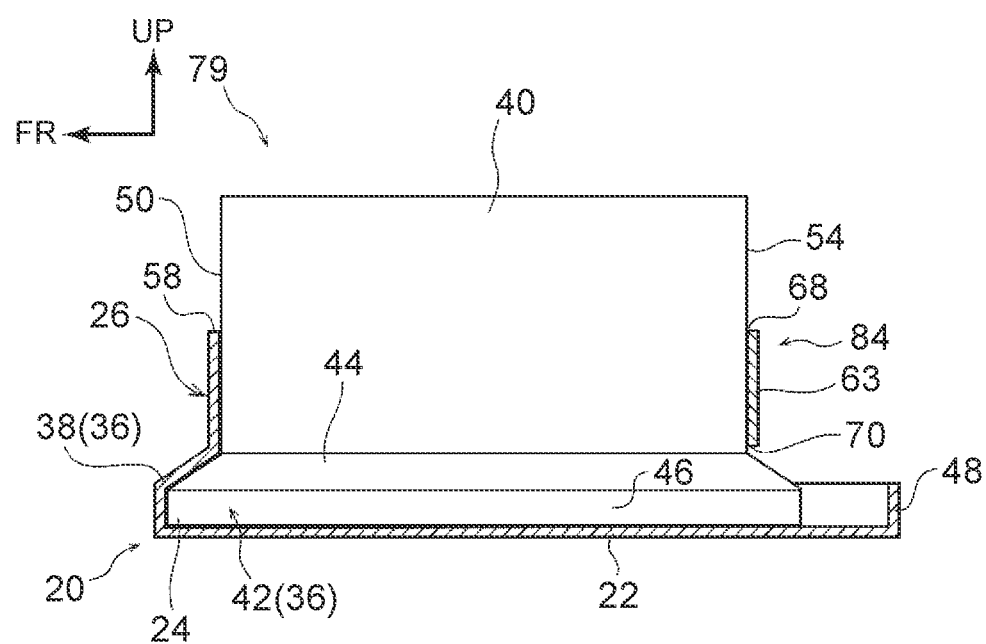
FIG. 6B is a sectional view illustrating a state cut along a line VIB-VIB In FIG. 5 and corresponds to FIG. 3B.

As illustrated in FIG. 5, an in-vehicle device fixing structure 79 of the second embodiment has a basic configuration similar to that of the first embodiment, and has a feature in that a fastening portion 74 in a holding member 84 is provided only on a fourth-side-face holding portion 65 side.

That is, the holding member 84 is attached to a base member 20. The fastening portion 74 is provided on a vehicle lower side of a fourth-side-face holding portion 65 in the holding member 84. A bolt 80 is inserted into a fastening hole 76 formed in the fastening portion 74 and a fastening hole 78 of a bottom wall portion 22 of the base member 20 and fixed with a nut 82, so that the holding member 84 is fixed to the base member 20 (see FIG. 6A).

Operation/Effect of Second Embodiment

Next will be described the operation and effect of the present embodiment.

Even with the above configuration, the in-vehicle device fixing structure of the present embodiment is configured similarly to the in-vehicle device fixing structure 14 of the first embodiment except that the fastening portion 74 in the holding member 84 is provided only on the fourth-side-face holding portion 65 side, thereby making it possible to obtain the same effect as the first embodiment. Further, the fastening portion 74 is not placed in a third-side-face holding portion 63 in the holding member 84 (see FIG. 6B). Accordingly, an operation space for fastening the bolt 80 is unnecessary on the third-side-face holding portion 63 side of the holding member 84. This makes it possible to further reduce a space in which the battery 40 is to be placed.

Note that, in the present embodiment, the fastening portion 74 in the holding member 84 is provided only in the fourth-side-face holding portion 65, but alternatively, the fastening portion 74 may be provided only in the third-side-face holding portion 63.

Third Embodiment

Next will be described an in-vehicle device fixing structure of a third embodiment of the present disclosure with reference to FIGS. 7 to 10. Note that a constituent basically the same as in the first embodiment has the same reference sign as in the first embodiment, and a description thereof is omitted.

Figure 7:
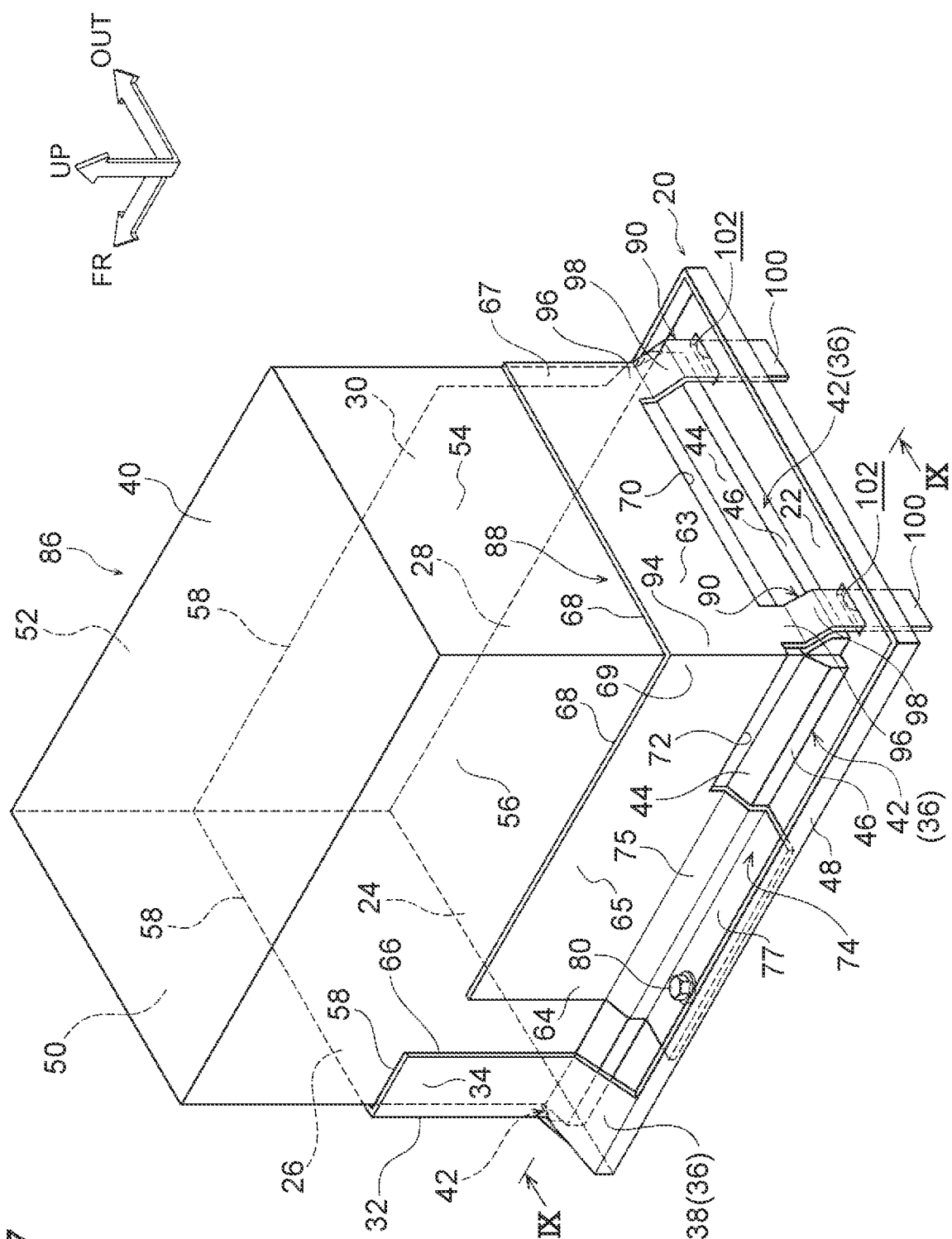
FIG. 7 is a perspective view illustrating an in-vehicle device fixing structure of a third embodiment and corresponds to FIG. 2.
Figure 8:
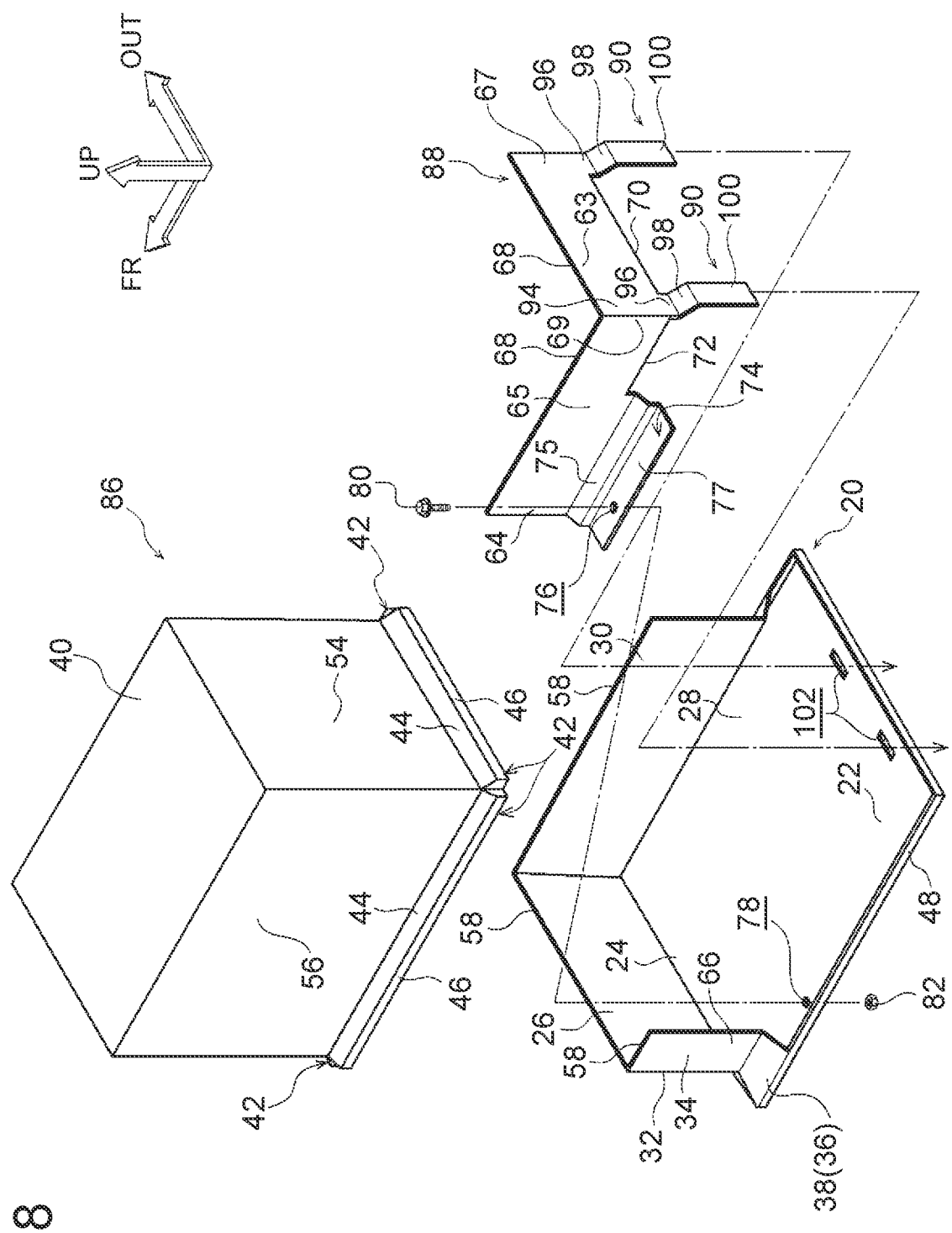
FIG. 8 is an exploded perspective view illustrating the in-vehicle device fixing structure of the third embodiment.
Figure 9:
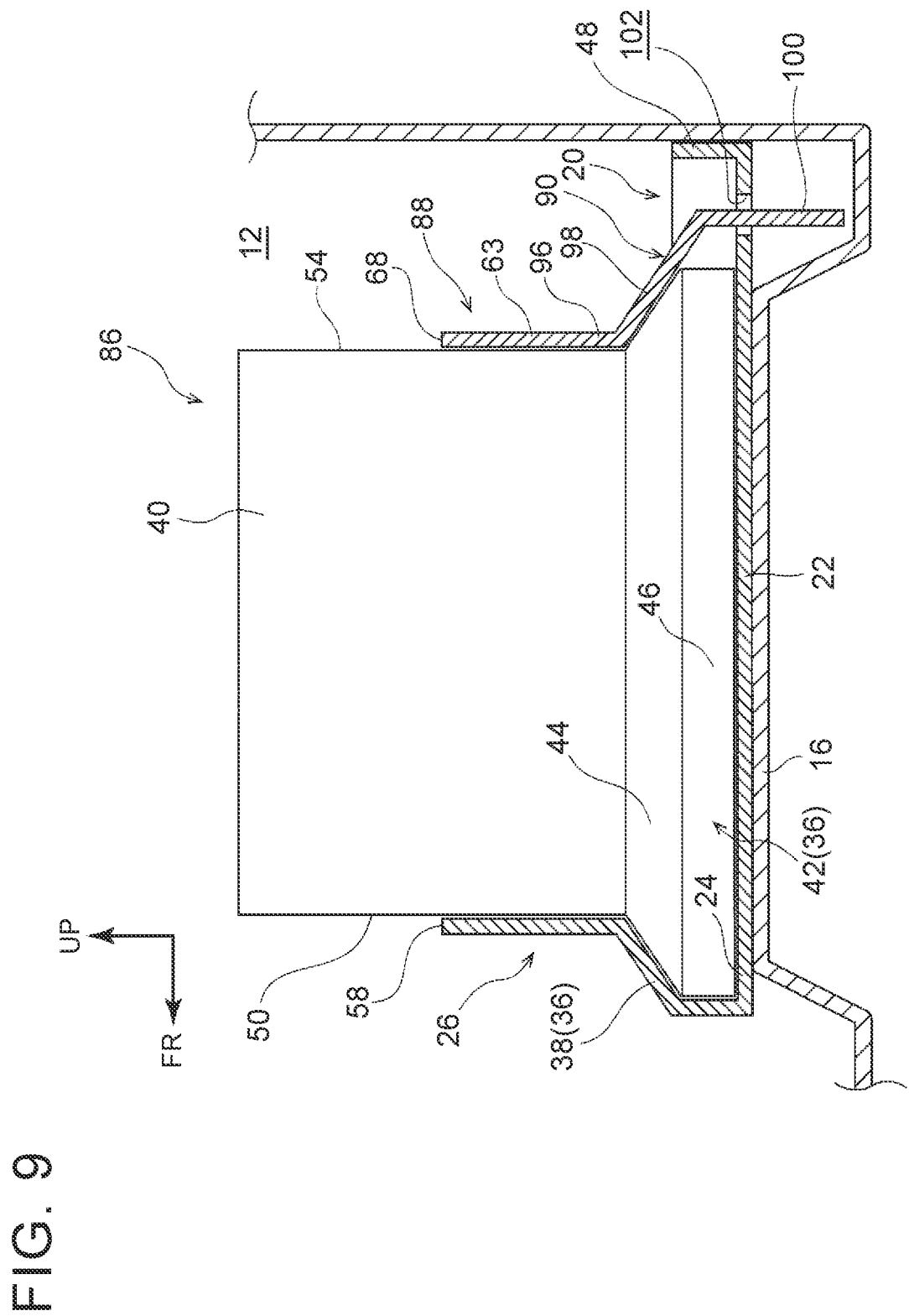
FIG. 9 is a sectional view illustrating a state cut n along a line IX-IX in FIG. 7.

As illustrated in FIG. 7, an in-vehicle device fixing structure 86 of the third embodiment has a basic configuration similar to that of the first embodiment, and has a feature in that inserts 90 are provided in a holding member 88.

That is, the holding member 88 is attached to a base member 20. The inserts 90 are provided on a vehicle lower side of a third-side-face holding portion 63 in the holding member 88. The inserts 90 are provided on respective ends 67, 94 of the third-side-face holding portion 63 in the vehicle width direction, and the inserts 90 are each formed generally in a rectangular shape with its longitudinal direction being along the vehicle up-down direction in a vehicle rear view More specifically, the insert 90 includes an insert upper part 96 extending from a lower end 70 in the end 67, 94 of the third-side-face holding portion 63 toward the vehicle lower side. Further, the insert 90 includes: an insert inclined wall portion 98 provided on the vehicle lower side of the insert upper part 96 and provided as a part of an engageable portion so as to extend toward the vehicle lower side along an inclined portion 44 of a projecting portion 42 of a battery 40; and an insert lower wall portion 100 provided as another part of the engageable portion so as to extend from a lower end of the insert inclined wall portion 98 toward the vehicle lower side generally along the vehicle up-down direction. The insert lower wall portion 100 is inserted into the after-mentioned through-hole 102 formed in a bottom wall portion 22 of the base member 20 (see FIG. 8), and a lower end of the insert lower wall portion 100 is projected toward the vehicle lower side from the bottom wall portion 22 of the base member 20 by a predetermined dimension (15 mm in the present embodiment) or more (see FIG. 9). Note that a dimension from the lower end of the insert lower wall portion 100 to an upper end 68 of the third-side-face holding portion 63 is set to be smaller than a dimension of the battery 40 in the vehicle up-down direction.

The through-hole 102 is formed in the bottom wall portion 22 of the base member 20 at a position corresponding to the insert lower wall portion 100. The through-hole 102 is formed so as to penetrate in a plate-thickness direction of the bottom wall portion 22, and a dimension thereof in the vehicle width direction is set to be larger than a dimension of the insert lower wall portion 100 in the vehicle width direction.

Operation/Effect of Third Embodiment

Next will be described the operation and effect of the present embodiment.

Even with the above configuration, the in-vehicle device fixing structure of the present embodiment is configured similarly to the in-vehicle device fixing structure 14 of the first embodiment except that the inserts 90 are provided in the holding member 88, thereby making it possible to obtain the same effect as the first embodiment. Further, the inserts 90 provided in the holding member 88 extend generally toward the vehicle lower side, and are inserted into the through-holes 102 of the base member 20. Accordingly, even when a load is input into the holding member 88 from the battery 40, the load is transmitted to the base member 20 via the inserts 90, thereby making it possible to restrain deformation of the holding member 88. This accordingly makes it possible to more surely hold the battery 40.

Further, since the inserts 90 are inserted into the through-holes 102 of the base member 20, an operation of fastening bolts 80 is unnecessary, so that an operation space for fastening the inserts 90 to the base member 20 is unnecessary. This makes it possible to further reduce a space in which the battery 40 is to be placed.

Further, when a load to rotate the battery 40 generally in a horizontal direction is input into the battery 40, a force to move the ends 67, 94 generally along the vehicle front-rear direction is applied to the ends 67, 94 of the third-side-face holding portion 63 of the holding member 88 in the vehicle width direction. Since the inserts 90 are placed in the ends 67, 94 of the third-side-face holding portion 63, the force to move the ends 67, 94 generally along the vehicle front-rear direction is transmitted to the base member 20 effectively. Accordingly, it is possible to effectively restrain the rotation of the holding member 88, eventually, the battery 40. This accordingly makes it possible to more surely hold the battery 40.

Further, the inserts 90 are separately provided at respective positions corresponding to the ends 67, 94 of the third-side-face holding portion 63 in the vehicle width direction. Accordingly, since the inserts are not provided except the positions corresponding to the ends 67, 94 of the third-side-face holding portion 63 in the vehicle width direction, thereby making it possible to achieve a weight reduction of components.

Figure 10:
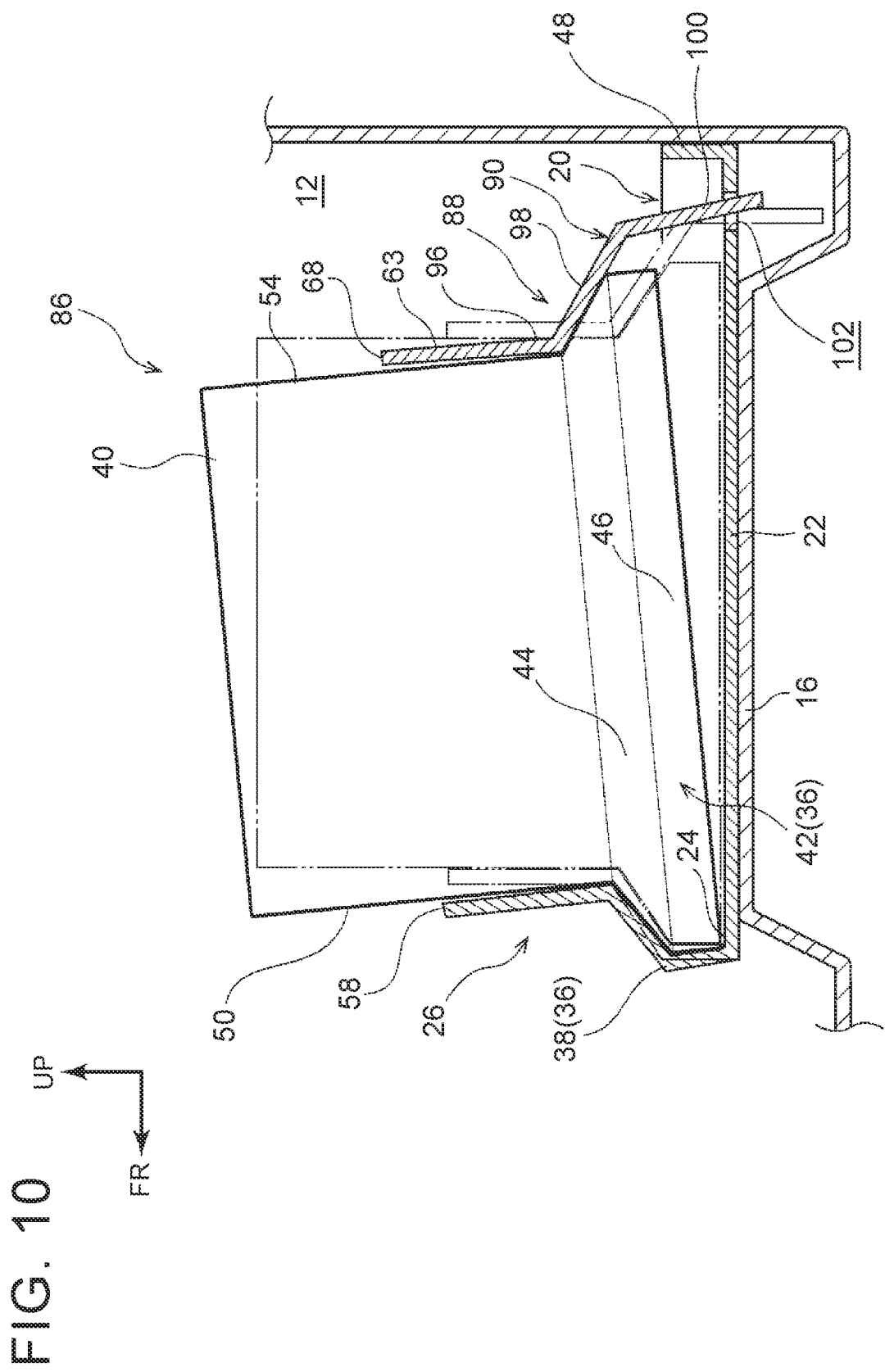
FIG. 10 is a sectional view corresponding to FIG. 9 and illustrates a state where a load is input into an in-vehicle device of the in-vehicle device fixing structure of the third embodiment.

Further, a projection amount of the lower ends of the inserts 90 from the bottom wall portion 22 is a predetermined dimension or more. Accordingly, as illustrated in FIG. 10, when a load is input into the battery 40 and the battery 40 is to move (see a continuous line in the figure), it is possible to restrain the inserts 90 of the holding member 88 from being pulled out of the through-holes 102 of the base member 20. This accordingly makes it possible to further more surely hold the battery 40.

Further, the dimension from the lower end of the insert lower wall portion 100 to the upper end 68 of the third-side-face holding portion 63 is set to be smaller than the dimension of the battery 40 in the vehicle up-down direction. Accordingly, it is not necessary to provide a space to deal with the insertion of the inserts 90 of the holding member 88 into the through-holes 102 of the base member 20, on the vehicle upper side of the battery 40. This makes it possible to further reduce a space in which the battery 40 is to be placed.

Note that, in the present embodiment, the inserts 90 are provided on the vehicle lower side of the third-side-face holding portion 63, but alternatively, the inserts 90 may be provided only on the vehicle lower sides of respective ends 64, 69 of a fourth-side-face holding portion 65. In this configuration, when a load to rotate the battery 40 generally in the horizontal direction is input into the battery 40, a force to move the ends 64, 69 generally along the vehicle width direction is applied to the end 64 of the fourth-side-face holding portion 65 of the holding member 88 in the vehicle front-rear direction and the end 69 on an opposite side to the end 64. Here, in a case where the inserts 90 are provided in the fourth-side-face holding portion 65, the inserts 90 are placed in respective ends 64, 69 of the fourth-side-face holding portion 65. Accordingly, a force to move the ends 64, 69 generally along the vehicle width direction is transmitted to the base member 20 effectively. Accordingly, it is possible to effectively restrain the rotation of the holding member 88, eventually, the battery 40. Further, in addition to this, the inserts 90 may be provided both on the vehicle lower side of the third-side-face holding portion 63 of the holding member 88 and on the vehicle lower side of the fourth-side-face holding portion 65 thereof.

Further, the lower end of the insert lower wall portion 100 of the insert 90 is projected toward the vehicle lower side from the bottom wall portion 22 of the base member 20 by the predetermined dimension or more, and a projection amount thereof is set to 15 mm or more. Alternatively, the projection amount may be changed in accordance with the size, the position of the gravitational center, or the like of the in-vehicle device to be provided on the base member 20, or the lower end of the insert lower wall portion 100 may not be projected. That is, the insert tower wall portion 100 may be set so as not to be pulled out of the through-hole 102 of the base member 20 when a collision load is input into the in-vehicle device at the time of a vehicle rear collision and the in-vehicle device is to move.

Figure 11:
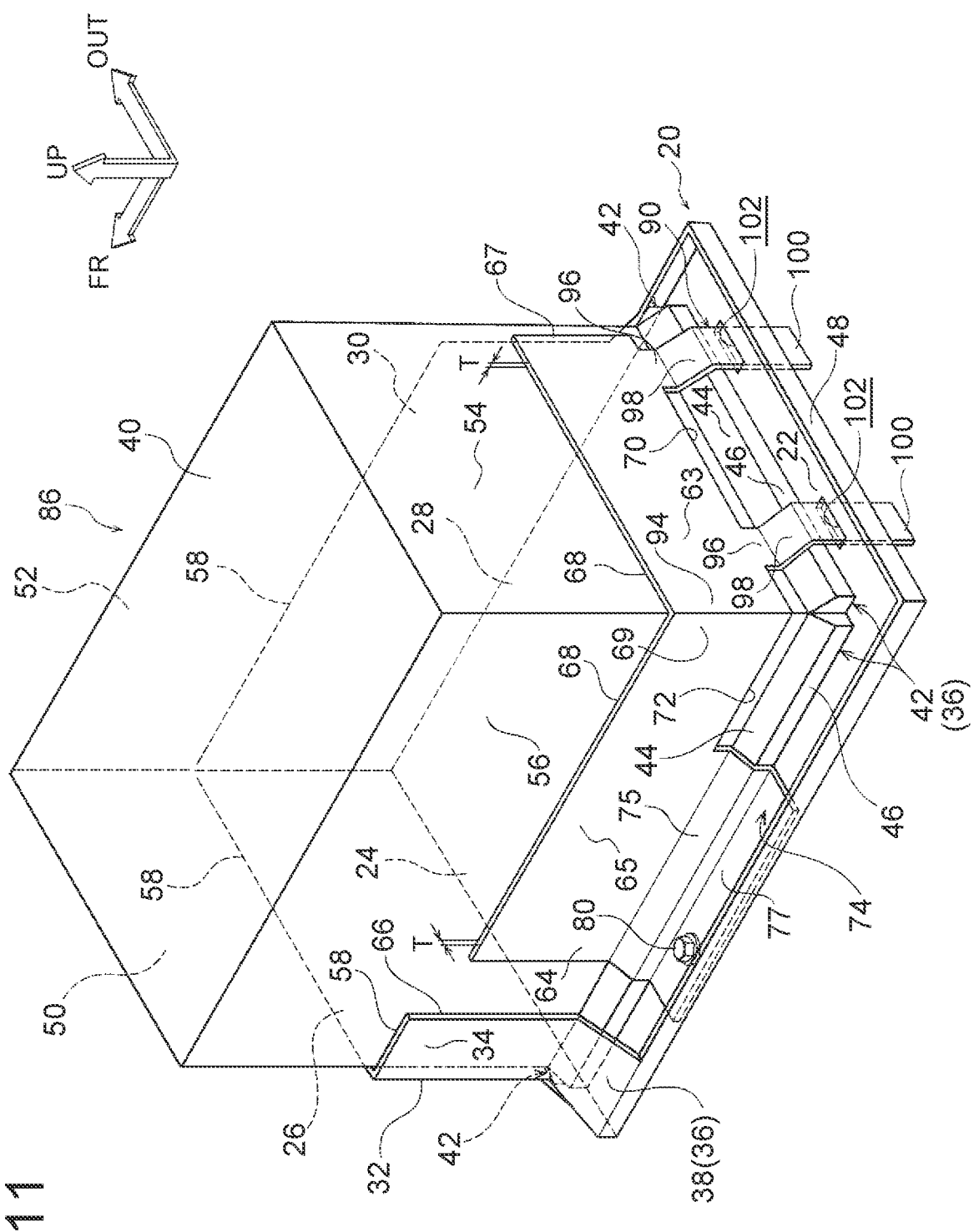
FIG. 11 is a perspective view illustrating a modification of the in-vehicle device fixing structure of the third embodiment and corresponds to FIG. 2.

Furthermore, the inserts 90 are provided on respective ends 67, 94 of the third-side-face holding portion 63 in the vehicle width direction. Alternatively the inserts 90 may be provided in a part except the ends 67, 94 of the third-side-face holding portion 63 in the vehicle width direction, as illustrated in FIG. 11. Further, even in a case where the inserts 90 are provided in the fourth-side-face holding portion 65, it is desirable that the inserts 90 be provided in the ends 64, 69 of the fourth-side-face holding portion 65 in the vehicle front-rear direction. Alternatively, the inserts 90 may be provided in a part other than the ends 64, 69 of the fourth-side-face holding portion 65 in the vehicle front-rear direction.

Further, a fastening portion 74 in the holding member 88 is provided only on the fourth-side-face holding portion 65, but alternatively, the fastening portion 74 may be provided in the third-side-face holding portion 63, or may be provided in both of the third-side-face holding portion 63 and the fourth-side-face holding portion 65.

Fourth Embodiment

Next will be described an in-vehicle device fixing structure of a fourth embodiment of the present disclosure with reference to FIG. 12A and FIG. 12B. Note that a constituent basically the same as in the third embodiment has the same reference sign as in the third embodiment, and a description thereof is omitted.

Figure 12A:
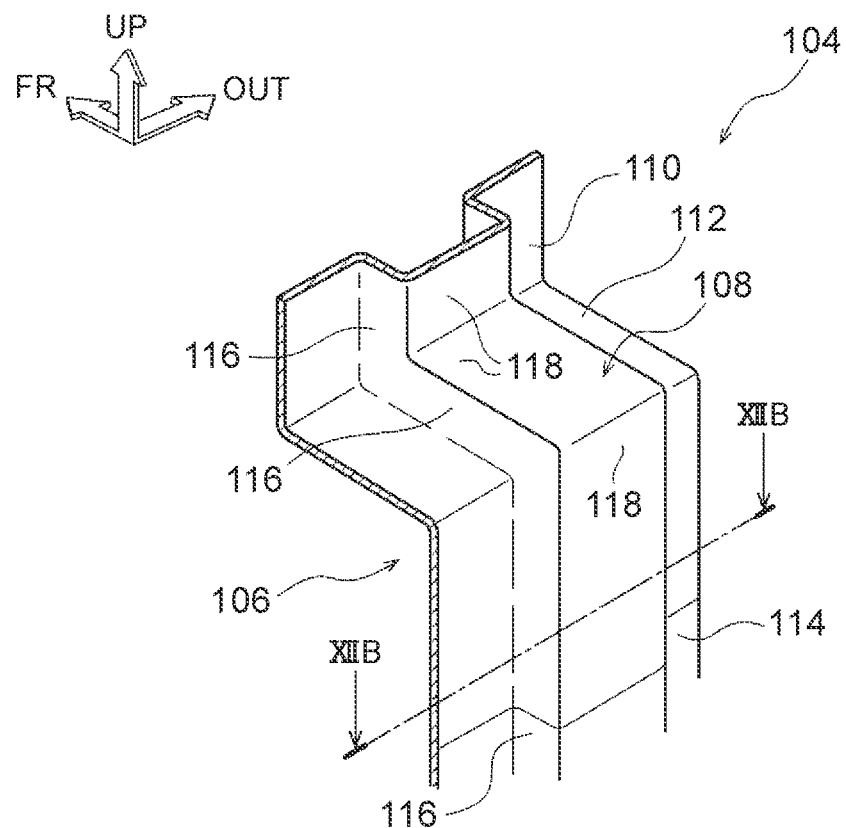
FIG. 12A is a perspective view illustrating a state where an insert of an in-vehicle device fixing structure of a fourth embodiment is viewed from a vehicle rear side.
Figure 12B:
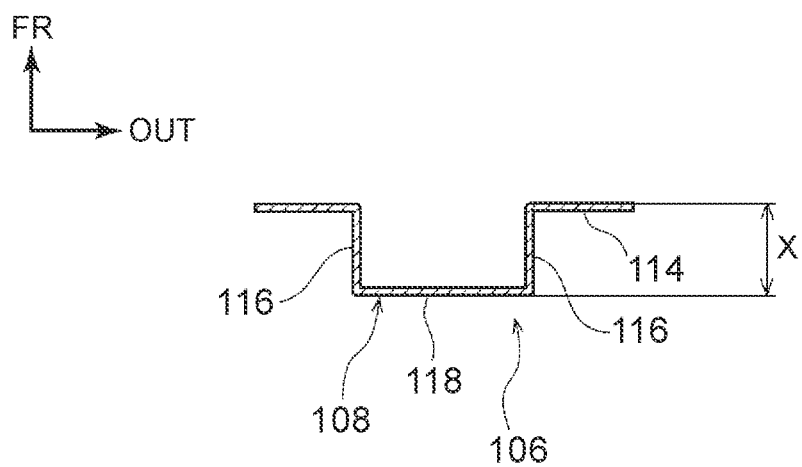
FIG. 12B is a sectional view illustrating a state cut along a line XIIB-XIIB in FIG. 12A.

As illustrated in FIG. 12A, an in-vehicle device fixing structure 104 of the fourth embodiment has a basic configuration similar to that of the third embodiment, and has a feature in that a reinforcing portion 108 is provided in an insert 106.

That is, the inserts 106 are provided on the vehicle lower side of a third-side-face holding portion 63 in a holding member 88. The inserts 106 are provided on respective ends 67, 94 of the third-side-face holding portion 63 in the vehicle width direction as illustrated in FIG. 7, and the inserts 106 are each formed generally in a rectangular shape with its longitudinal direction being along the vehicle up-down direction in a vehicle rear view. More specifically, the insert 106 includes an insert upper part 110 extending from a lower end 70 in the end 67, 94 of the third-side-face holding portion 63 toward the vehicle lower side. Further, the insert 106 includes: an insert inclined wall portion 112 provided on the vehicle lower side of the insert upper part 110 and provided as a part of an engageable portion so as to extend toward the vehicle lower side along an inclined portion 44 (see FIG. 7) of a projecting portion 42 of a battery 40; and an insert lower wall portion 114 provided as another part of the engageable portion so as to extend from a lower end of the insert inclined wall portion 112 toward the vehicle lower side generally along the vehicle up-down direction. The insert lower wall portion 114 is inserted into a through-hole 102 as illustrated in FIG. 7.

A reinforcing portion 108 is formed generally in a center part of the insert 106 in the vehicle width direction along the longitudinal direction of the insert 106. As illustrated in FIG. 12B, the reinforcing portion 108 is formed to have a generally U-shaped section, which is perpendicular to the longitudinal direction of the insert 106, and is constituted by: a pair of reinforcement wall portions 116 extending in respective normal directions from the insert upper part 110, the insert inclined wall portion 112, and the insert lower wall portion 114; and a reinforcement bottom wall portion 118 connecting respective tip ends of the reinforcement wall portion 116. In other words, the reinforcing portion 108 is formed in a projecting bead shape with its longitudinal direction being along the vehicle up-down direction. Accordingly, a dimension X in the normal direction of the insert lower wall portion 114 penetrating through the through-hole 102 is from a vehicle front surface of the insert lower wall portion 114 up to a vehicle rear surface of the reinforcement wall portion 116, and thus, the dimension X is set to be larger than a plate thickness T (see FIG. 11) of the third-side-face holding portion 63. Note that the plate thickness T of the third-side-face holding portion 63 is the same as a plate thickness T of a fourth-side-face holding portion 65.

Operation/Effect of Fourth Embodiment

Next will be described the operation and effect of the present embodiment.

Even with the above configuration, the in-vehicle device fixing structure of the present embodiment is configured similarly to the in-vehicle device fixing structure 86 of the third embodiment except that the reinforcing portion 108 is provided in the insert 106, thereby making it possible to obtain the same effect as the third embodiment. Further, since the reinforcing portion 108 having a bead shape with its longitudinal direction being along the vehicle up-down direction is formed in the insert 106, the bending rigidity of the insert 106 improves. Accordingly, a load transmitted from the battery 40 to the holding member 88 can be more surely transmitted from the insert 106 of the holding member 88 to the base member 20. This makes it possible to restrain deformation of the holding member 88, thereby making it possible to more surely hold the battery 40.

Figure 13A:
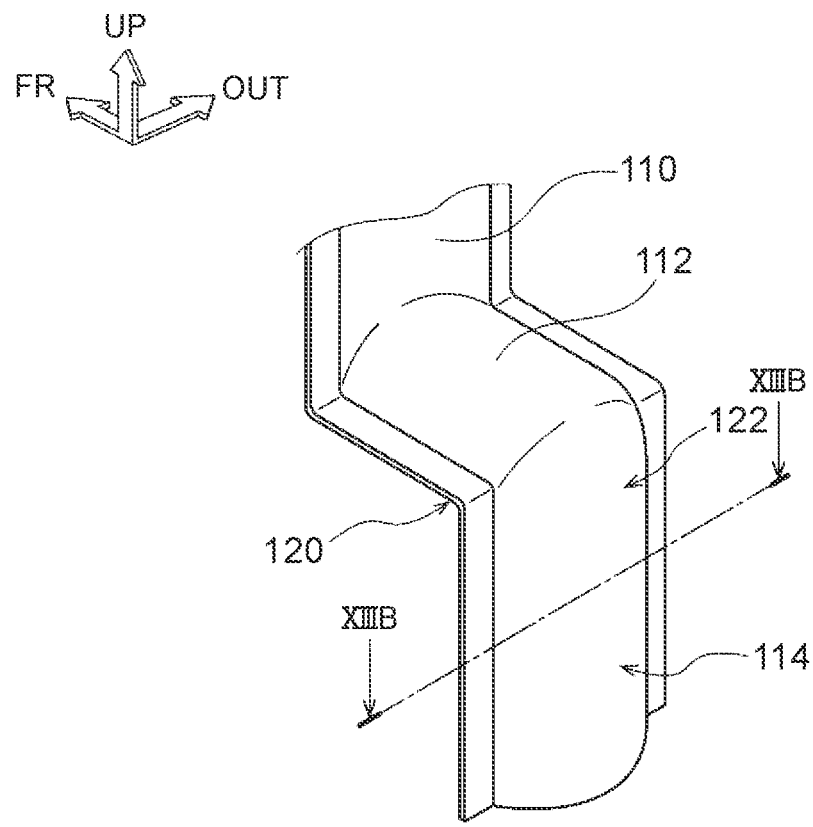
FIG. 13A is a perspective view illustrating a state where an insert of an in-vehicle device fixing structure of a modification of the fourth embodiment is viewed from the vehicle rear side and corresponds to FIG. 11A.
Figure 13B:
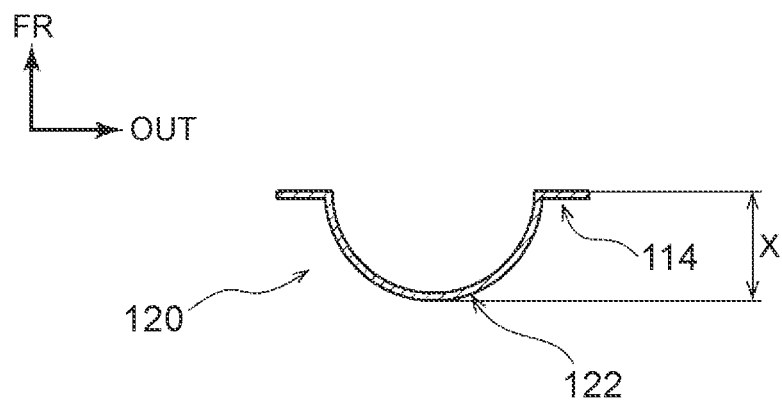
FIG. 13B is a sectional view illustrating a state cut along a line XIIIB-XIIIB in FIG. 13A and corresponds to FIG. 11B.

Note that, in the present embodiment, the insert 106 is provided with the reinforcing portion 108 formed in a projecting bead shape, but alternatively, the insert 106 may have other configurations. As one example, like an insert 120 illustrated in FIGS. 13A 13B, such a configuration may be employed that a bead-shaped reinforcing portion 122 with its longitudinal direction being along the vehicle up-down direction is provided at least in an insert lower wall portion 114 such that the reinforcing portion 122 curves so as to project along a normal direction of the insert lower wall portion 114. Further, in addition to that, a configuration in which at least the whole insert lower wall portion 114 is curved generally in a semi-circular shape in the normal direction, a configuration in which a plate thicknesses of at least the insert lower wall portion 114 is increased, or a configuration in which at least the insert lower wall portion 114 has a dual structure by folding a tip end of the insert lower wall portion 114 can be employed.

Further, in the first to fourth embodiments described above, the battery 40 is placed on the base member 20. Alternatively, a fuel cell stack, an inverter, or the like devices may be placed thereon. Further, the positions of respective upper ends 58 of the first side wall portion 26 and the second side wall portion 30 and respective upper ends 68 of the third-side-face holding portion 63 and the fourth-side-face holding portion 65 may be changed appropriately in accordance with a position of a gravitational center of a device to be placed.

Furthermore, the in-vehicle device fixing structures 14, 79, 86, 104 are provided on the right side in the vehicle width direction inside the trunk room 12. Alternatively, the in-vehicle device fixing structures 14, 79, 86, 104 may be provided on the left side or at other positions. Further, the first side wall portion 26 provided on the vehicle front side of the base member 20 may be provided on the vehicle rear side of the base member 20, and the second side wall portion 30 provided on the outer side of the base member 20 in the vehicle width direction may be provided on the inner side of the base member 20 in the vehicle width direction. Further, the arrangement position of the holding members 60, 84, 88 may be changed appropriately in accordance with the positions of the first side wall portion 26 and the second side wall portion 30 of the base member 20. Furthermore, the in-vehicle device fixing structures 14, 79, 86, 104 are provided inside the trunk room 12, but alternatively, they may be provided in a power unit room or at other positions.

Further, the in-vehicle device locking portion 36 is provided at a position corresponding to the lower end of the battery 40, but alternatively, the in-vehicle device locking portion 36 may be provided at other positions such as a position corresponding to the upper end of the battery 40. Further, the in-vehicle device locking portion 36 is provided in the base member 20, the holding member 60, 84, 88, and the battery 40, but alternatively, the in-vehicle device locking portion 36 may be provided in the base member 20 and the holding member 60, 84, 88. As one example of the configuration, a folding portion to be locked to the top face of the battery 40 may be provided in respective ends, on the vehicle upper side, of the base member 20 and the holding member 60, 84, 88, so as to restrain the movement of the battery 40 to the vehicle upper side.

Embodiments of the present disclosure have been described above, but the present disclosure is not limited to the above and may be modified in various ways to be performed as long as the modifications are not beyond the gist thereof.

What is claimed is:

1. An in-vehicle device fixing structure comprising:
 a base member attached to a vehicle body, the base member including a flat-shaped bottom wall, a first side wall expanding toward a vehicle upper side from the bottom wall and substantially along a vehicle width direction, and a second side wall expanding toward the vehicle upper side from the bottom wall and substantially along a vehicle front-rear direction;
 an in-vehicle device having a box shape, the in-vehicle device including
  a first side face that is opposed to the first side wall when the in-vehicle device is placed on the bottom wall,
  a second side face that is opposed to the second side wall when the in-vehicle device is placed on the bottom wall,
  a third side face provided on a side opposite to the first side face, and
  a fourth side face provided on a side opposite to the second side face;
 a holding member including a third-side-face holding portion opposed to the third side face of the in-vehicle device, a fourth-side-face holding portion opposed to the fourth side face of the in-vehicle device, and a fastening portion attached to the bottom wall of the base member via a fastener and having a plate shape; and
 an in-vehicle device locking portion provided in at least the base member and the holding member among the base member, the in-vehicle device, and the holding member, the in-vehicle device locking portion being configured to restrain a movement of the in-vehicle device toward the vehicle upper side.

2. The in-vehicle device fixing structure according to claim 1, wherein
 the in-vehicle device locking portion includes
  projecting portions provided in respective lower ends of the first side face, the second side face, the third side face, and the fourth side face so as to project outwardly from a respective faces of the in-vehicle device, and engageable portions provided in the base member and the holding member so as to be engaged with the projecting portions.

3. The in-vehicle device fixing structure according to claim 1, wherein
the fastening portion is placed in either one of the third-side-face holding portion and the fourth-side-face holding portion.

4. The in-vehicle device fixing structure according to claim 1, wherein
respective upper ends of the first side wall and the second side wall and respective upper ends of the third-side-face holding portion and the fourth-side-face holding portion are placed on the vehicle upper side relative to a gravitational center of the in-vehicle device.

5. The in-vehicle device fixing structure according to claim 1, wherein
inserts are provided in at least one of the third-side-face holding portion and the fourth-side-face holding portion, the inserts extending substantially toward a vehicle lower side,
through-holes are provided in the bottom wall at respective positions corresponding to the inserts, and
the inserts are inserted into the through-holes.

6. The in-vehicle device fixing structure according to claim 5, wherein
the inserts are placed in both ends of the third-side-face holding portion in the vehicle width direction and in both ends of the fourth-side-face holding portion in the vehicle front-rear direction.

7. The in-vehicle device fixing structure according to claim 5, wherein
each insert includes a reinforcing portion provided in a part of the insert in a width direction of the insert, along a longitudinal direction of the insert, the reinforcing portion having a strength larger than an other part of the insert.

8. The in-vehicle device fixing structure according to claim 5, wherein
the fastening portion is placed in either one of the third-side-face holding portion and the fourth-side-face holding portion, and
the inserts are placed in an other one of the third-side-face holding portion and the fourth-side-face holding portion, the other one being not provided with the fastening portion.

9. A structure for fixing an in-vehicle device, the in-vehicle device having a box shape and including a first side face, a second side face, a third side face provided on a side opposite to the first side face, and a fourth side face provided on a side opposite to the second side face, the structure comprising:
a base member attached to a vehicle body, the base member includes
a bottom wall having a flat shape,
a first side wall extending toward a vehicle upper side from the bottom wall and substantially along a vehicle width direction, the first side wall being opposed to the first side face when the in-vehicle device is placed on the bottom wall, and
a second side wall extending toward the vehicle upper side from the bottom wall and substantially along a vehicle front-rear direction, the second side wall being opposed to the second side face when the in-vehicle device is placed on the bottom wall;
a holding member including
a third-side-face holding portion opposed to the third side face of the in-vehicle device,
a fourth-side-face holding portion opposed to the fourth side face of the in-vehicle device, and
a fastening portion attached to the bottom wall of the base member via a fastener and having a plate shape; and
an in-vehicle device locking portion provided in at least the base member and the holding member among the base member, the in-vehicle device, and the holding member, the in-vehicle device locking portion being configured to restrain a movement of the in-vehicle device toward the vehicle upper side.

10. The structure for fixing the in-vehicle device, according to claim 9, wherein
the in-vehicle device locking portion includes
projecting portions provided in respective lower ends of the first side face, the second side face, the third side face, and the fourth side face so as to project outwardly from a respective faces of the in-vehicle device, and
engageable portions provided in the base member and the holding member so as to be engaged with the projecting portions.

11. The structure for fixing the in-vehicle device, according to claim 9, wherein
the fastening portion is placed in either one of the third-side-face holding portion and the fourth-side-face holding portion.

12. The structure for fixing the in-vehicle device, according to claim 9, wherein
inserts are provided in at least one of the third-side-face holding portion and the fourth-side-face holding portion, the inserts extending substantially toward a vehicle lower side,
through-holes are provided in the bottom wall at respective positions corresponding to the inserts, and
the inserts are inserted into the through-holes.

13. An in-vehicle device fixing structure comprising:
a base member attached to a vehicle body, the base member including bottom wall having a flat-shape, a first side wall expanding toward a vehicle upper side from the bottom wall and along a first direction perpendicular to a vehicle up-down direction, and a second side wall expanding toward the vehicle upper side from the bottom wall and along a second direction perpendicular to the vehicle up-down direction and the first direction;
an in-vehicle device having a box shape, the in-vehicle device including
a first side face opposed to the first side wall when the in-vehicle device is placed on the bottom wall,
a second side face opposed to the second side wall when the in-vehicle device is placed on the bottom wall,
a third side face provided on a side opposite to the first side face, and
a fourth side face provided on a side opposite to the second side face; and
a holding member including a third-side-face holding portion being opposed to the third side face of the in-vehicle device, a fourth-side-face holding portion being opposed to the fourth side face of the in-vehicle device, and a fastening portion attached to the bottom wall of the base member via a fastener and having a plate shape, wherein:

the base member includes a first engageable portion and the holding member includes a second engageable portion; and the first engageable portion and the second engageable portion are configured to be engaged with the in-vehicle device so as to restrain a movement of the in-vehicle device toward the vehicle upper side.

14. The in-vehicle device fixing structure according to claim 13, wherein the in-vehicle device includes
- projecting portions provided in respective lower ends of the first side face, the second side face, the third side face, and the fourth side face and projecting outwardly from a respective faces of the in-vehicle device, and the first engageable portion and the second engageable portion are engaged with the projecting portions.

15. The in-vehicle device fixing structure according to claim 13, wherein the fastening portion is placed in either one of the third-side-face holding portion and the fourth-side-face holding portion.

16. The in-vehicle device fixing structure according to claim 13, wherein inserts are provided in at least one of the third-side-face holding portion and the fourth-side-face holding portion and extending substantially toward a vehicle lower side, through-holes are provided in the bottom wall at respective positions corresponding to the inserts, and the inserts are inserted into the through-holes.

* * * * *